(12) United States Patent
Moini et al.

(10) Patent No.: US 11,148,954 B2
(45) Date of Patent: Oct. 19, 2021

(54) PROCESS FOR PREPARING A ZEOLITIC MATERIAL COMPRISING A METAL M AND HAVING FRAMEWORK TYPE AEI

(71) Applicant: BASF Corporation, Florham Park, NJ (US)

(72) Inventors: Ahmad Moini, Iselin, NJ (US); Robert McGuire, Florham Park, NJ (US); Ulrich Mueller, Ludwigshafen am Rhein (DE)

(73) Assignee: BASF Corporation, Florham Park, NJ (US)

( * ) Notice: Subject to any disclaimer, the term of this patent is extended or adjusted under 35 U.S.C. 154(b) by 80 days.

(21) Appl. No.: 16/605,069

(22) PCT Filed: May 15, 2018

(86) PCT No.: PCT/EP2018/062531
§ 371 (c)(1),
(2) Date: Oct. 14, 2019

(87) PCT Pub. No.: WO2018/210815
PCT Pub. Date: Nov. 22, 2018

(65) Prior Publication Data
US 2021/0017033 A1    Jan. 21, 2021

(30) Foreign Application Priority Data
May 15, 2017   (EP) ..................................... 17171041

(51) Int. Cl.
*C01B 39/48*     (2006.01)
*B01J 29/70*     (2006.01)
(Continued)

(52) U.S. Cl.
CPC ............... *C01B 39/48* (2013.01); *B01J 29/70* (2013.01); *B01J 29/7049* (2013.01); *B01J 29/76* (2013.01);
(Continued)

(58) Field of Classification Search
CPC ........ C01B 39/026; C01B 39/48; B01J 29/70; B01J 29/76; B01J 29/7049
See application file for complete search history.

(56) References Cited

U.S. PATENT DOCUMENTS

2016/0243531 A1   8/2016  Dusselier et al.

FOREIGN PATENT DOCUMENTS

| JP | 2016-166124 A | 9/2016 |
| WO | WO 2013/068976 A1 | 5/2013 |
| WO | WO 2013/182974 A1 | 12/2013 |

OTHER PUBLICATIONS

Hunsicker et al, "Return to Issueprevarticlenext Framework Zinc-Substituted Zeolites: Synthesis, and Core-Level and Valence-Band XPS" Chem. Mater. 2002, 14, 11, 4807-4811 (Year: 2002).*

(Continued)

*Primary Examiner* — David M Brunsman
(74) *Attorney, Agent, or Firm* — Finnegan, Henderson, Farabow, Garrett & Dunner LLP

(57) ABSTRACT

A process for preparing a zeolitic material comprising a metal M, having framework type AEI, and having a framework structure which comprises a tetravalent element Y, a trivalent element X, and oxygen, said process comprising (i) providing a zeolitic material comprising the metal M, having a framework type other than AEI, and having a framework structure comprising the trivalent element X, and oxygen; (ii) preparing a synthesis mixture comprising the zeolitic material provided in (i), water, a source of the tetravalent element Y, and an AEI framework structure directing agent;

(Continued)

(iii) subjecting the synthesis mixture prepared in (ii) to hydrothermal synthesis conditions comprising heating the synthesis mixture to a temperature in the range of from 100 to 200° C. and keeping the synthesis mixture at a temperature in this range under autogenous pressure, obtaining the zeolitic material having framework type AEI; wherein Y is one or more of Si, Ge, Sn, Ti, Zr; wherein X is one or more of Al, B, Ga, In; wherein M is a transition metal of groups 7 to 12 of the periodic table of elements.

16 Claims, 5 Drawing Sheets

(51) Int. Cl.
    *B01J 29/76*     (2006.01)
    *B01J 37/08*     (2006.01)
    *C01B 39/02*     (2006.01)
(52) U.S. Cl.
    CPC ............. *B01J 37/08* (2013.01); *C01B 39/026* (2013.01); *C01P 2002/72* (2013.01); *C01P 2004/03* (2013.01)

(56) References Cited

OTHER PUBLICATIONS

Mauro et al, Facile Synthesis of AEI Zeolites by Hydrothermal Conversion of FAU Zeolites in the Presence of Tetraethylphosphonium Cation, | Chem. Lett. 2014, 43, 302-304 (Year: 2014).*
Funase et al, "Hydrothermal Conversion of Titanated FAU to AEI Zeolite and Its Enhanced Catalytic Performance for NO x Reduction" Advanced Porous Materials, vol. 4, No. 1, Jun. 2016, pp. 62-72(11) Abstract Only (Year: 2016).*
Takata et al, "Incorporation of various heterometal atoms in CHA zeolites by hydrothermal conversion of FAU zeolite and their performance for selective catalytic reduction of NOx with ammonia" Microporous and Mesoporous Materials vol. 246, Jul. 1, 2017, pp. 89-101 (published online Mar. 19, 2017) (Year: 2017).*
jJiao et al, "Dual template synthesis of SAPO-18/34 zeolite intergrowths and their performances in direct conversion of syngas to olefins", Microporous and Mesoporous Materials vol. 306, Oct. 15, 2020, 110444 (Year: 2020).*
Madsen, I.C., et al., "Quantitative Phase Analysis", in: Dinnebier, R.E., Billinge S.J.L.(eds) "Power diffraction: theory and practice", the Royal Society of Chemistry, Cambridge, 2008, pp. 298-331.
U.S. Appl. No. 15/264,428, filed Dec. 21, 2017, US 2017-0362513 A1, McGuire, R., et al.
U.S. Appl. No. 15/752,991, filed Feb. 15, 2018, US 2018-0243691 A1, Mueller, U., et al.
U.S. Appl. No. 15/779,218, filed Dec. 6, 2018, US 2018-034545 A1, Maurer, S., et al.
U.S. Appl. No. 15/744,324, filed Jul. 26, 2018, US 2018-0208532 A1, Parvulescu, A.-N., et al.
U.S. Appl. No. 16/086,251, filed Sep. 18, 2018, Kalo, B.
U.S. Appl. No. 15/779,314, filed Nov. 22, 2018, US 2018-0333696 A1, Burckhart, J., et al.
U.S. Appl. No. 16/060,260, filed Dec. 20, 2018, US 2018-0362353 A1, Vautravers, N., et al.
U.S. Appl. No. 16/076,600, filed Aug. 8, 2018, US 2018-0077779 A1, Riedel, D., et al.
U.S. Appl. No. 16/321,252, filed Jan. 28, 2019, US 2019-0169037 A1, Trukhan, N., et al.
U.S. Appl. No. 16/349,364, filed May 13, 2019, US 2019-0367377 A1, Parvulescu, A.-N., et al.
U.S. Appl. No. 16/461,134, filed May 15, 2019, Parvulescu, A.-N., et al.
U.S. Appl. No. 16/470,834, filed Mar. 18, 2019, Parvulescu, A.-N., et al.
U.S. Appl. No. 16/462,430, filed May 20, 2019, US 2019-0321811, Parvulescu, A.-N., et al.
U.S. Appl. No. 16/308,730, filed Dec. 10, 2018, US 2019-0143272 A1, Trukhan, N., et al.
U.S. Appl. No. 15/775,657, filed Nov. 15, 2018, US 2018-0328601 A1, Weickert, M., et al.
U.S. Appl. No. 16/060,737, filed Jun. 8, 2018, US 2018-0362357 A1, Feyen, M., et al.
U.S. Appl. No. 16/462,408, filed Nov. 28, 2017, McGuire, R., et al.
U.S. Appl. No. 16/318,221, filed Jan. 16, 2019, US 2019-0169149 A1, Teles, J.H., et al.
U.S. Appl. No. 16/060,229, filed Dec. 20, 2018, US 2019-0362351 A1, Parvulescu, A.-N., et al.
U.S. Appl. No. 16/315,345, filed Jan. 4, 2019, US 2019-0322634 A1, Teles, J.H., et al.
U.S. Appl. No. 16/315,680, filed Jan. 7, 2019, US 2019-0210989 A1, Teles, J.H., et al.
U.S. Appl. No. 16/310,645, filed Dec. 17, 2018, US 2019-0330171 A1, Parvulescu, A.-N., et al.
U.S. Appl. No. 16/304,511, filed Nov. 26, 2018, US 2019-0134564 A1, Feyen, M., et al.
U.S. Appl. No. 16/463,263, filed May 22, 2019, US 2019-0300375 A1, McGuire, R., et al.
U.S. Appl. No. 16/469,782, filed Dec. 7, 2017, Schroeter, M.K., et al.
U.S. Appl. No. 16/308,928, filed Dec. 11, 2018, US 2019-0144290 A1, Marx, S., et al.
U.S. Appl. No. 16/372,801, filed Jul. 25, 2019, US 2019-0225500 A1, Kunkes, E.L., et al.
U.S. Appl. No. 16/464,894, filed Nov. 29, 2017, Parvulescu, A.-N., et al.
U.S. Appl. No. 16/464,943, filed May 29, 2019, Parvulescu, A.-N., et al.
U.S. Appl. No. 16/464,966, filed May 29, 2019, Parvulescu, A.-N., et al.
U.S. Appl. No. 16/330,592, filed May 15, 2019, Parvulescu, A.-N., et al.
U.S. Appl. No. 16/467,716, filed Jun. 7, 2019, Ahmad, M., et al.
U.S. Appl. No. 16/607,514, filed Apr. 24, 2018, McGuire, R., et al.
U.S. Appl. No. 16/607,532, filed Apr. 24, 2018, McGuire, R., et al.
U.S. Appl. No. 16/336,661, filed Mar. 26, 2019, Parvulescu, A.-N., et al.
U.S. Appl. No. 16/488,962, filed Feb. 27, 2018, Parvulescu, A.-N., et al.
U.S. Appl. No. 16/605,133, filed Oct. 14, 2019, McGuire, R., et al.
U.S. Appl. No. 16/605,069, filed Oct. 14, 2019, Moini, A., et al.
U.S. Appl. No. 16/485,291, filed Aug. 12, 2019, US 2019-0375724 A1, Gordillo, A., et al.
U.S. Appl. No. 16/500,313, filed Oct. 2, 2019, Woerz, N.T., et al.
U.S. Appl. No. 16/610,131, filed Nov. 1, 2019, Parvulescu, A.-N., et al.
U.S. Appl. No. 16/495,574, filed Sep. 19, 2019, Xue, W.-M., et al.
U.S. Appl. No. 16/485,077, filed Aug. 9, 2019, US 2019-0358613 A1, Ernst, S., et al.
International Search Report and Written Opinion dated Jun. 22, 2018 in PCT/EP2018/062531, 13 pages.
International Preliminary Report on Patentability and Written Opinion dated Nov. 28, 2019 in PCT/EP2018/062531 (English Translation only), 8 pages.

* cited by examiner

PROCESS FOR PREPARING A ZEOLITIC MATERIAL COMPRISING A METAL M AND HAVING FRAMEWORK TYPE AEI

The present invention relates to a process for preparing a zeolitic material comprising a metal M, having framework type AEI and having a framework structure which comprises a tetravalent element Y, a trivalent element X, and oxygen. Further, the present invention relates to a zeolitic material comprising a metal M, having framework type AEI and having a framework structure which comprises a tetravalent element Y, a trivalent element X, and oxygen, obtainable or obtained by said process, and further relates to the use of said zeolitic material as a catalytically active material.

Zeolitic materials having framework type AEI are known to be potentially effective as catalysts or catalyst components for treating combustion exhaust gas in industrial applications, for example for converting nitrogen oxides (NOx) in an exhaust gas stream. Synthetic AEI zeolitic materials generally produced by precipitating crystals of the zeolitic material from a synthesis mixture which contains the sources of the elements from which the zeolitic framework is built, such as a source of silicon and a source of aluminum. Further, AEI zeolitic materials may additionally contain one or metals M which are usually incorporated into the zeolitic material by a suitable post-treatment step. Therefore, it was an object of the present invention to provide a novel and advantageous process for preparing an AEI zeolitic material comprising a metal M. According to the present invention, it was found that this object can be solved via zeolitic framework conversion according to which a starting material which is a suitable zeolitic material having a framework type other than AEI and which comprises a metal M is suitably reacted to obtain the zeolitic material having framework type AEI and comprising a metal M. According to this process, it not necessary to use, during the synthesis of the AEI zeolitic material, an additional source of the metal M, and also no post-treatment to incorporate the metal M is necessary.

Therefore, the present invention relates to a process for preparing a zeolitic material comprising a metal M, having framework type AEI, and having a framework structure which comprises a tetravalent element Y, a trivalent element X, and oxygen, said process comprising:
(i) providing a zeolitic material comprising the metal M, having a framework type other than AEI, and having a framework structure comprising the trivalent element X, and oxygen;
(ii) preparing a synthesis mixture comprising the zeolitic material provided in (i), water, a source of the tetravalent element Y, and an AEI framework structure directing agent;
(iii) subjecting the synthesis mixture prepared in (ii) to hydrothermal synthesis conditions comprising heating the synthesis mixture to a temperature in the range of from 100 to 200° C. and keeping the synthesis mixture at a temperature in this range under autogenous pressure, obtaining the zeolitic material having framework type AEI;
wherein Y is one or more of Si, Ge, Sn, Ti, Zr;
wherein X is one or more of Al, B, Ga, In;
wherein M is a transition metal of groups 7 to 12 of the periodic table of elements.

Generally, M is a transition metal of groups 7 to 12 of the periodic table of elements. Preferably, M is one or more of Fe, Co, Ni, Cu, and Zn, more preferably one or more of Fe and Cu. More preferably, M is Cu.

With regard to the amount of the metal M comprised in the zeolitic material provided in (i), no specific restrictions exits. For example, the zeolitic material provided in (i) may comprise in an amount in the range of from 0.01 to 10 weight-%, or in the range of from 0.02 to 8 weight-%, or in the range of from 0.05 to 6 weight-%, calculated as elemental M and based on the total weight of the zeolitic material. Preferably, the zeolitic material provided in (i) comprises M in an amount in the range of from 0.1 to 5 weight-%, preferably in the range of from 0.2 to 4 weight-%, more preferably in the range of from 0.5 to 3 weight-%, calculated as elemental M and based on the total weight of the zeolitic material.

Preferably, the zeolitic material provided in (i) has a framework structure which additionally comprises the tetravalent element Y. Preferably, at least 95 weight-%, more preferably at least 98 weight-%, more preferably at least 99 weight-%, more preferably at least 99.5 weight-% of the zeolitic material provided in (i) consist of Y, X, O, M, and H.

Generally, Y is one or more of Si, Ge, Sn, Ti, Zr. Preferably, Y is Si. Generally, X is one or more of Al, B, Ga. Preferably, X is Al. More preferably, X is Al and Y is Si. More preferably Y is Si and X is Al, and the molar ratio of Si relative to Al is in the range of from 3:1 to 50:1, preferably in the range of from 5:1 to 30:1, more preferably in the range of from 8:1 to 25:1.

With regard to the zeolitic material provided in (i) having a framework type other than AEI, generally no specific restrictions exist. It is conceivable that the framework type is one or more of ABW, ACO, AEI, AEL, AEN, AET, AFG, AFI, AFN, AFO, AFR, AFS, AFT, AFV, AFX, AFY, AHT, ANA, APC, APD, AST, ASV, ATN, ATO, ATS, ATT, ATV, AVL, AWO, AWW, BCT, BEA, BEC, BIK, BOF, BOG, BOZ, BPH, BRE, BSV, CAN, CAS, CDO, CFI, CGF, CGS, CHA, -CHI, -CLO, CON, CSV, CZP, DAC, DDR, DFO, DFT, DOH, DON, EAB, EDI, EEI, EMT, EON, EPI, ERI, ESV, ETR, EUO, *-EWT, EZT, FAR, FAU, FER, FRA, GIS, GIU, GME, GON, GOO, HEU, IFO, IFR, -IFU, IFW, IFY, IHW, IMF, IRN, IRR, -IRY, ISV, ITE, ITG, ITH, *-ITN, ITR, ITT, -ITV, ITW, IWR, IWS, IWV, IWW, JBW, JNT, JOZ, JRY, JSN, JSR, JST, JSW, KFI, LAU, LEV, LIO, -LIT, LOS, LOV, LTA, LTF, LTJ, LTL, LTN, MAR, MAZ, MEI, MEL, MEP, MER, MFI, MFS, MON, MOR, MOZ, *MRE, MSE, MSO, MTF, MTN, MTT, MTW, MVY, MWF, MWW, NAB, NAT, NES, NON, NPO, NPT, NSI, OBW, OFF, OKO, OSI, OSO, OWE, -PAR, PAU, PCR, PHI, PON, POS, PSI, PUN, RHO, -RON, RRO, RSN, RTE, RTH, RUT, RWR, RWY, SAF, SAO, SAS, SAT, SAV, SBE, SBN, SBS, SBT, SEW, SFE, SFF, SFG, SFH, SFN, SFO, SFS, *SFV, SFW, SGT, SIV, SOD, SOF, SOS, SSF, *-SSO, SSY, STF, STI, *STO, STT, STW, -SVR, SW, SZR, TER, THO, TOL, TON, TSC, TUN, UEI, UFI, UOS, UOV, UOZ, USI, UTL, UWY, VET, VFI, VNI, VSV, WEI, -WEN, YUG, ZON. Preferably, the zeolitic material provided in (i) having a framework type other than AEI has framework type CHA, FAU, LTA, MOR, MFI, or BEA, more preferably CHA or FAU.

Therefore, the present invention further preferably relates to a process for preparing a zeolitic material comprising a metal M, having framework type AEI, and having a framework structure which comprises a tetravalent element Y, a trivalent element X, and oxygen, preferably the process of any one of embodiments 1 to 10, said process comprising
(i) providing a zeolitic material comprising the metal M, having a framework type other than AEI, and having a framework structure comprising the tetravalent element Y, the trivalent element X, and oxygen;

(ii) preparing a synthesis mixture comprising the zeolitic material provided in (i), water, a source of the tetravalent element Y, and an AEI framework structure directing agent;

(iii) subjecting the synthesis mixture prepared in (ii) to hydrothermal synthesis conditions comprising a hydrothermal synthesis temperature in the range of from 100 to 200° C., obtaining a mixture comprising the zeolitic material comprising a metal M, having framework type AEI, and having a framework structure which comprises a tetravalent element Y, a trivalent element X, and oxygen;

wherein Y is Si, X is Al, M is Cu, and wherein the zeolitic material provided in (i) has framework type CHA or FAU.

Generally, the zeolitic material comprising the metal M, having a framework type other than AEI, and having a framework structure comprising the tetravalent element Y, the trivalent element X, and oxygen can be provided in (i) according to any conceivable process. Preferably, providing the zeolitic material according to (i) comprises (i.1) providing a zeolitic material which does not comprise the metal M, which has the framework type other than AEI, and which has the framework structure comprising the trivalent element X and oxygen;

(i.2) supporting the metal M on the zeolitic material provided in (i.1), preferably comprising (i.2.1) preparing a mixture comprising the zeolitic material provided according to (i.1), a source of the metal M, a solvent for the source of the metal M, and optionally an acid, preferably an organic acid, wherein the solvent preferably comprises water, the source of the metal M preferably comprises a salt of the metal M and the acid preferably comprises acetic acid;

(i.2.2) heating the mixture prepared in (i.2.1) to a temperature in the range of from 30 to 90° C., preferably in the range of from 40 to 80° C.;

(i.2.3) preferably cooling, more preferably rapid-cooling the mixture obtained from (i.2.2);

(i.2.4.) separating the zeolitic material comprising the metal M from the mixture obtained from (i.2.2) or (i.2.3), preferably from (i.2.4), the separating preferably comprising washing the zeolitic material comprising the metal M;

(i.2.5) preferably drying the zeolitic material comprising the metal M obtained from (i.2.4) in a gas atmosphere, preferably at a temperature of the gas atmosphere in the range of from 90 to 200° C., more preferably in the range of from 100 to 150° C., wherein the gas atmosphere preferably comprises oxygen;

(i.2.6) preferably calcining the zeolitic material comprising the metal M obtained from (i.2.4) or (i.2.5), preferably (i.2.5), in a gas atmosphere, preferably at a temperature of the gas atmosphere in the range of from 350 to 600° C., more preferably in the range of from 400 to 550° C., wherein the gas atmosphere preferably comprises oxygen.

As mentioned above, the zeolitic material provided in (i) preferably has framework type CHA or FAU. Therefore, it is preferred that the zeolitic material which does not comprise the metal M and which has the framework type other than AEI has the framework type CHA or FAU. In case it has the framework type CHA, it is preferred that the zeolitic material which does not comprise the metal M, which has the framework type CHA, and which has the framework structure comprising the trivalent element X and oxygen provided in (i.1), a is template-free (TF)-CHA wherein for instance, TF-CHA may be prepared in accordance with the template-free synthesis method as described in WO 2013/068976 A e.g. on page 6, lines 4 to 20, wherein some specific examples are also provided on page 40 to 47 thereof, which is incorporated herein by reference. TF-CHA is more preferably prepared according to the template-free synthesis method as described in WO 2013/068976 A, in Example 2, page 43, line 29 to page 44, line 8.

Preferably, the zeolitic material provided in (i) is a calcined zeolitic material, more preferably a zeolitic material having been calcined in a gas atmosphere at a temperature of the gas atmosphere in the range of from 350 to 600° C., preferably in the range of from 400 to 550° C. Preferably, the gas atmosphere comprises oxygen. More preferably, the gas atmosphere comprises air, lean air, or nitrogen such as technical nitrogen, more preferably air. More preferably, the gas atmosphere is air.

Generally, it may be conceivable that the zeolitic material is provided in its ammonium form, in its hydrogen form (H form), or in any other suitable cation form such as in its sodium form. Preferably, the zeolitic material provided in (i) is in its hydrogen (H) form.

In the context of step (ii) of the inventive process, the synthesis mixture prepared in (ii) which is subjected to (iii) preferably does not comprise a zeolitic material having framework type AEI. More preferably, the synthesis mixture prepared in (ii) which is subjected to (iii) does not contain a zeolitic seed material having framework type AEI.

Generally, according to (ii), any suitable source of the tetravalent element Y can be used. In particular if Y is Si, the source of Y comprises, more preferably is, one or more of a wet-process silica, a dry-process silica, and a colloidal silica. Colloidal silica, preferably as an alkaline and/or ammoniacal solution, more preferably as an ammoniacal solution, is commercially available, inter alia, for example as Ludox®, Syton®, Nalco® or Snowtex®. "Wet process" silica is commercially available, inter alia, for example as Hi-Sil®, Ultrasil®, Vulcasil®, Santocel®, Valron-Estersil®, Tokusil® or Nipsil®. "Dry process" silica is commercially available, inter alia, for example as Aerosil®, Reolosil®, Cab-O-Sil®, Fransil® or ArcSilica®. Inter alia, an ammoniacal solution of colloidal silica can be used according to the present invention. More preferably, if Y is Si, the source of the tetravalent element Y according to (ii) comprises, preferably is, a colloidal silica.

According to (ii), the AEI framework structure directing agent can be any agent which results in the preparation of a zeolitic material having framework type AEI according to (iii). Preferably, the AEI framework structure directing agent comprises one or more quaternary phosphonium cation containing compounds and/or one or more quaternary ammonium cation containing compounds.

Preferably, the one or more phosphonium cation containing compounds comprise one or more $R^1R^2R^3R^4P^+$-containing compounds, wherein $R^1$, $R^2$, $R^3$, and $R^4$ independently from one another stand for optionally substituted and/or optionally branched $(C_1-C_6)$alkyl, more preferably $(C_1-C_5)$alkyl, more preferably $(C_1-C_4)$alkyl, more preferably $(C_2-C_3)$alkyl, and preferably for optionally substituted methyl or ethyl, more preferably $R^1$, $R^2$, $R^3$, and $R^4$ stand for optionally substituted ethyl, preferably unsubstituted ethyl;

Preferably, the one or more quaternary ammonium cation containing compounds comprise one or more N,N-dialkyldialkylpiperidinium cation containing compounds, more preferably one or more N,N—$(C_1-C_3)$dialkyl-$(C_1-C_3)$dialkylpiperidinium cation containing compounds, more preferably one or more N,N—($C_1$-$C_2$)dialkyl-($C_1$-$C_2$)dialkylpiperi-dinium cation containing compounds, wherein more preferably, the one or more quaternary ammonium cation containing compounds are selected from the group consisting of N,N—($C_1$-$C_2$)dialkyl-2,6-($C_1$-$C_2$)dialkylpiperidinium cation and N,N—($C_1$-$C_2$)dialkyl-3,5-($C_1$-$C_2$)di-alkylpiperidinium cation containing compounds, more preferably from the group consisting of N,N-dimethyl-2,6-($C_1$-$C_2$)dialkylpiperidinium cation and N,N-dimethyl-3,5-($C_1$-$C_2$)dialkyl-piperidinium cation containing compounds, more preferably from the group consisting of N,N-dimethyl-2,6-dimethylpiperidinium cation and N,N-dimethyl-3,5-dimethyl-piperidinium cation containing compounds.

Preferably, the one or more quaternary phosphonium cation containing compounds and/or the one or more quaternary ammonium cation containing compounds are salts, preferably selected from the group consisting of halides, more preferably chloride and/or bromide, more preferably chloride; hydroxide; sulfate; nitrate; phosphate; acetate; and mixtures of two or more thereof, more preferably from the group consisting of chloride, hydroxide, sulfate, and mixtures of two or more thereof, wherein more preferably the one or more quaternary phosphonium cation containing compounds and/or the one or more quaternary ammonium cation containing compounds are hydroxides and/or chlorides, and more preferably hydroxides.

More preferably the AEI framework structure directing agent comprises, preferably is N,N-dimethyl-3,5-dimethylpiperidinium hydroxide.

Preferably, in the synthesis mixture prepared in (ii) which is subjected to (iii), the weight ratio of the zeolitic material relative to the source of the tetravalent element Y, calculated as $YO_2$, is in the range of from 1.0:1 to 3.0:1, more preferably in the range of from 1.5:1 to 2.5, more preferably in the range of from 2.0:1 to 2.2:1. According to a conceivable embodiment of the present invention, the weight ratio of the zeolitic material relative to the source of the tetravalent element Y may be infinity, which means that in addition to the zeolitic material which comprises Y, no further source of the tetravalent element is comprised in the synthesis mixture in (ii).

Preferably, in the synthesis mixture prepared in (ii) which is subjected to (iii), the weight ratio of the zeolitic material relative to the water is in the range of from 0.005:1 to 0.030:1, more preferably in the range of from 0.010:1 to 0.025:1, more preferably in the range of from 0.015:1 to 0.020:1.

Preferably, in the synthesis mixture prepared in (ii) which is subjected to (iii), the weight ratio of the zeolitic material relative to the AEI framework structure directing agent is in the range of from 0.1:1 to 0.9:1, preferably in the range of from 0.3:1 to 0.7:1, more preferably in the range of from 0.4:1 to 0.5:1.

The pH of the synthesis mixture prepared in (ii) is not restricted to any particular value. Preferably, the synthesis mixture prepared in (ii) which is subjected to (iii) additionally comprises a source of a base, more preferably a source of hydroxide.

Preferably, the synthesis mixture prepared in (ii) which is subjected to (iii) additionally comprises a source of one or more of an alkali metal such as sodium, lithium, potassium, and an alkaline earth metal such as magnesium, calcium, strontium, barium, more preferably an alkali metal, more preferably sodium.

More preferably, the source of a base is the source of one or more of an alkali metal and an alkaline earth metal, preferably an alkali metal base, more preferably an alkali metal hydroxide, more preferably sodium hydroxide.

The synthesis mixture prepared in (ii) which is subjected to (iii) is not restricted to any particular weight ratio of the components comprised in the mixture. Preferably, in the synthesis mixture prepared in (ii) which is subjected to (iii), the weight ratio of the zeolitic material relative to the source of a base is in the range of from 0.1:1 to 1.0:1, preferably in the range of from 0.2:1 to 0.8:1, more preferably in the range of from 0.3:1 to 0.6:1.

Preferably, the synthesis mixture prepared in (ii) and which is subjected to (iii) does not comprise a source of the metal M other than the zeolitic material comprising the metal M. Preferably, at least 95 weight-%, preferably at least 98 weight-%, more preferably at least 99 weight-% of the synthesis mixture prepared in (ii) and subjected to (iii) consist of the zeolitic material provided in (i), the water, the source of the tetravalent element Y, the AEI framework structure directing agent, and preferably the source of a base and the source of one or more of an alkali metal and an alkaline earth metal.

Step (iii) of the inventive process comprises subjecting the synthesis mixture prepared in (ii) to hydrothermal synthesis conditions.

Preferably, the hydrothermal synthesis is carried out under autogenous pressure, preferably in an autoclave. Preferably, the synthesis mixture prepared in (ii) is heated in the autoclave to the hydrothermal synthesis temperature at a heating rate in the range of from 0.5 to 4 K/min, more preferably in the range of from 1 to 3 K/min. Preferably, the hydrothermal synthesis temperature to which the mixture is heated is in the range of from 110 to 175° C., preferably in the range of from 120 to 150° C. Preferably, the hydrothermal synthesis conditions further comprise stirring the synthesis mixture during at least a part of the synthesis time. Preferably, the hydrothermal synthesis conditions further comprise a hydrothermal synthesis time in the range of from 2 to 120 h, more preferably in the range of from 20 to 100 h, more preferably in the range of from 40 to 80 h. Therefore, it is preferred that according to (iii), the mixture provided in (ii) is heated to a temperature in the range of from 110 to 175° C., preferably in the range of from 120 to 150° C., and kept at this temperature for a period of time in the range of from 2 to 120 h. Therefore, it is further preferred that according to (iii), the mixture provided in (ii) is heated to a temperature in the range of from 110 to 175° C., preferably in the range of from 120 to 150° C., and kept at this temperature for a period of time in the range of from 20 to 120 h. Therefore, it is further preferred that according to (iii), the mixture provided in (ii) is heated to a temperature in the range of from 110 to 175° C., preferably in the range of from 120 to 150° C., and kept at this temperature for a period of time in the range of from 40 to 80 h.

From the hydrothermal synthesis according to (iii), a mixture is obtained which comprises the zeolitic material having framework type AEI suspended in its mother liquor, at the hydrothermal synthesis temperature. Since the hydrothermal synthesis is carried out under autogenous pressure, it is preferred (iii) further comprises depressurize the mixture. Either before, during, or after depressurizing, the inventive process preferably further comprises:

(iv) cooling the mixture obtained from (iii).

While there are no specific restrictions, it is preferred to cool the mixture to a temperature in the range of from 10 to 50° C., more preferably in the range of from 20 to 35° C.

Since, as mentioned above, a mixture is obtained from (iii) which comprises the zeolitic material having framework type AEI suspended in its mother liquor, it is further preferred that the inventive process further comprises:
- (v) separating the zeolitic material comprising the metal M from the mixture obtained from (iii) or (iv), preferably from the mixture obtained from (iv).

There are no specific restrictions on how the zeolitic material comprising the metal M may be separated. Preferably, said separation step (v) comprises
- (v.1) subjecting the mixture obtained from (iii) or (iv) to a solid-liquid separation method, preferably comprising a filtration method or a spraying method;
- (v.2) preferably washing the zeolitic material comprising the metal M obtained from (v.1);
- (v.3) drying the zeolitic material comprising the metal M obtained from (v.1) or (v.2), preferably (v.2).

As to (v.1), a spraying method may comprise spray-drying or spray-granulation. If (v.2) is carried out, it is preferred that the zeolitic material is washed with water as washing agent, preferably until the washing water has a conductivity of at most 500 microSiemens, preferably at most 200 microSiemens. As to (v.3), is is preferred that the zeolitic material is dried in a gas atmosphere having a temperature in the range of from 80 to 175° C., more preferably in the range of from 100 to 150° C. Preferably, the gas atmosphere comprises oxygen, more preferably comprises, more preferably is air, lean air, or synthetic air.

Preferably, the inventive process further comprises
- (vi) calcining the zeolitic material comprising the metal M obtained from (v).

If step (vi) is carried out, the zeolitic material comprising the metal M is preferably calcined in a gas atmosphere having a temperature in the range of from 400 to 600° C., more preferably in the range of from 450 to 550° C. Preferably, the gas atmosphere comprises oxygen, more preferably comprises, more preferably is air, lean air, or synthetic air.

Therefore, the present invention further preferably relates to a process for preparing a zeolitic material comprising a metal M, having framework type AEI, and having a framework structure which comprises a tetravalent element Y, a trivalent element X, and oxygen, said process comprising
- (i) providing a zeolitic material comprising the metal M, having a framework type other than AEI, and having a framework structure comprising the tetravalent element Y, the trivalent element X, and oxygen;
- (ii) preparing a synthesis mixture comprising the zeolitic material provided in (i), water, a source of the tetravalent element Y, and an AEI framework structure directing agent;
- (iii) subjecting the synthesis mixture prepared in (ii) to hydrothermal synthesis conditions comprising a hydrothermal synthesis temperature in the range of from 100 to 200° C., obtaining a mixture comprising the zeolitic material comprising a metal M, having framework type AEI, and having a framework structure which comprises a tetravalent element Y, a trivalent element X, and oxygen;
- (iv) cooling the mixture obtained from (iii), preferably to a temperature in the range of from 10 to 50° C., more preferably in the range of from 20 to 35° C.;
- (v) separating the zeolitic material comprising the metal M from the mixture obtained from (iv), comprising
  - (v.1) subjecting the mixture obtained from (iv) to a solid-liquid separation method, preferably comprising a filtration method or a spraying method;
  - (v.2) washing the zeolitic material comprising the metal M obtained from (v.1);
  - (v.3) drying the zeolitic material comprising the metal M obtained from (v.2) in a gas atmosphere having a temperature in the range of from 80 to 175° C.;
- (vi) calcining the zeolitic material comprising the metal M obtained from (v) in a gas atmosphere having a temperature in the range of from 400 to 600° C.

Generally, it is possible that according to the process of the present invention, the conversion process described above resulting in the zeolitic material comprising the metal M and having framework type AEI is an essentially complete conversion, and the material obtained essentially consists of the zeolitic material comprising the metal M and having framework type AEI. However, it is also possible that the conversion is partially incomplete, and in the material obtained, not only the zeolitic material comprising the metal M and having framework type AEI is comprised, but also one or more other materials, preferably one or more zeolitic materials comprising the metal M and having a framework type other then AEI, preferably framework type FAU, LTA, MOR, MFI, or BEA, more preferably a zeolitic material having a framework type CHA or FAU.

Preferably, regarding such a respectively obtained composition, more than 50 weight-%, more preferably at least 60 weight-%, more preferably at least 70 weight-% of said composition comprising a zeolitic material comprising the metal M and having framework type AEI and having a framework structure which comprises a tetravalent element Y, a trivalent element X, and oxygen, consist of the zeolitic material comprising the metal M and having framework type AEI and having a framework structure which comprises a tetravalent element Y, a trivalent element X, and oxygen. More preferably at least 80 weight-%, more preferably of from 80 to 100 weight-% of the composition comprising a zeolitic material comprising the metal M and having framework type AEI and having a framework structure which comprises a tetravalent element Y, a trivalent element X, and oxygen, consist of the zeolitic material comprising the metal M and having framework type AEI and having a framework structure which comprises a tetravalent element Y, a trivalent element X, and oxygen. More preferably, at least 90 weight-%, more preferably at least 95 weight-%, more preferably at least 99 weight-% of the composition consist of the zeolitic material comprising the metal M and having framework type AEI and having a framework structure which comprises a tetravalent element Y, a trivalent element X, and oxygen, and a zeolitic material comprising the metal M and having framework type CHA and having a framework structure which comprises a tetravalent element Y, a trivalent element X, and oxygen. Such a partially incomplete conversion leading to said composition comprising the zeolitic material comprising the metal M and framework type AEI is taken into account in the second set of preferred embodiments of the present invention which is directed, e.g., to a process for preparing a composition. For the sake of completeness, it is mentioned that also for these embodiments, in case the conversion is complete, the composition is to be understood as consisting of the zeolitic material having framework type AEI. In any case, even if the conversion is partially incomplete, the invention nevertheless is directed, e.g., to a process for preparing a zeolitic material comprising the metal M and having framework type AEI since this zeolitic material is mandatorily comprised in said composition.

Depending on the intended use of the zeolitic material, the material, preferably obtained from (vi) can be employed as such. Further, it is conceivable that this zeolitic material is subjected to one or more further post-treatment steps. For example, the zeolitic material which is most preferably obtained as a powder can be suitably processed to a molding or a shaped body by any suitably method, including, but no restricted to, extruding, tabletting, spraying and the like. Preferably, the shaped body may have a rectangular, a triangular, a hexagonal, a square, an oval or a circular cross section, and/or preferably is in the form of a star, a tablet, a sphere, a cylinder, a strand, or a hollow cylinder. When preparing a shaped body, one or more binders can be used which may be chosen according to the intended use of the shaped body. Possible binder materials include, but are not restricted to, graphite, silica, titania, zirconia, alumina, and a mixed oxide of two or more of silicon, titanium and zirconium. The weight ratio of the zeolitic material relative to the binder is generally not subject to any specific restrictions and may be, for example, in the range of from 10:1 to 1:10. According to a further example according to which the zeolitic material is used, for example, as a catalyst or as a catalyst component for treating an exhaust gas stream, for example an exhaust gas stream of an engine, it is possible that the zeolitic material is used as a component of a washcoat to be applied onto a suitable substrate, such as a wall-flow filter or the like.

The present invention further relates to a zeolitic material comprising a metal M, having framework type AEI, and having a framework structure which comprises a tetravalent element Y, a trivalent element X, and oxygen, obtainable or obtained or preparable or prepared by a process described herein above.

Preferably, said zeolitic material comprises a metal M in an amount in the range of from 0.1 to 5 weight-%, more preferably in the range of from 0.2 to 4 weight-%, more preferably in the range of from 0.5 to 3 weight-%, calculated as elemental M and based on the total weight of the zeolitic material. M is a transition metal of groups 7 to 12 of the periodic table of elements, preferably M is Fe or Cu, more preferably Cu. Preferably, said zeolitic material comprises a metal M has a total amount of acid sites in the range of from 1.0 to 2.0 mmol/g, wherein the total amount of acid sites is defined as the total molar amount of desorbed ammonia per mass of the zeolitic material determined according to the temperature programmed desorption of ammonia (NH3-TPD) as described in Reference Example 1.6 herein; wherein the zeolitic material has an amount of medium acid sites in the range of from 0.1 to 0.8 mmol/g, wherein the amount of medium acid sites is defined as the amount of desorbed ammonia per mass of the zeolitic material determined according to the temperature programmed desorption of ammonia (NH3-TPD) as described in Reference Example 1.6 herein in the temperature range of from 250 to 500° C.

The zeolitic material comprising a metal M, having framework type AEI, and having a framework structure which comprises a tetravalent element Y, a trivalent element X, and oxygen, can be used for any conceivable purpose, including, but not limited to, an absorbent, an adsorbent, a molecular sieve, a catalyst, a catalyst carrier or an intermediate for preparing one or more thereof. Preferably, the zeolitic material comprising a metal M of the present invention is used as a catalytically active material, as a catalyst, or as a catalyst component, more preferably as a catalytically active material, more preferably for the selective catalytic reduction of nitrogen oxides in an exhaust gas stream, preferably an exhaust gas stream from a diesel engine. More preferably, for the conversion of a C1 compound to one or more olefins, preferably for the conversion of methanol to one or more olefins or the conversion of a synthetic gas comprising carbon monoxide and hydrogen to one or more olefins.

Further, the present invention relates to a method for selectively catalytically reducing nitrogen oxides in an exhaust gas stream, preferably an exhaust gas stream from a diesel engine, said method comprising bringing the zeolitic material comprising a metal M, having framework type AEI, and having a framework structure which comprises a tetravalent element Y, a trivalent element X, and oxygen obtainable or obtained or preparable or prepared by a process according to the present invention, in contact with said exhaust gas stream, or for catalytically converting a C1 compound to one or more olefins, preferably converting methanol to one or more olefins or converting a synthetic gas comprising carbon monoxide and hydrogen to one or more olefins, said method comprising bringing the zeolitic material comprising a metal M, having framework type AEI, and having a framework structure which comprises a tetravalent element Y, a trivalent element X, and oxygen obtainable or obtained or preparable or prepared by a process according to the present invention, in contact with said C1 compound.

The present invention is further illustrated by the following set of embodiments and combinations of embodiments resulting from the dependencies and back-references as indicated. In particular, it is noted that in each instance where a range of embodiments is mentioned, for example in the context of a term such as "The process of any one of embodiments 1 to 4", every embodiment in this range is meant to be explicitly disclosed for the skilled person, i.e. the wording of this term is to be understood by the skilled person as being synonymous to "The process of any one of embodiments 1, 2, 3, and 4".

1. A process for preparing a zeolitic material comprising a metal M, having framework type AEI, and having a framework structure which comprises a tetravalent element Y, a trivalent element X, and oxygen, said process comprising
   (i) providing a zeolitic material comprising the metal M, having a framework type other than AEI, and having a framework structure comprising the trivalent element X, and oxygen;
   (ii) preparing a synthesis mixture comprising the zeolitic material provided in (i), water, a source of the tetravalent element Y, and an AEI framework structure directing agent;
   (iii) subjecting the synthesis mixture prepared in (ii) to hydrothermal synthesis conditions comprising heating the synthesis mixture to a temperature in the range of from 100 to 200° C. and keeping the synthesis mixture at a temperature in this range under autogenous pressure, obtaining the zeolitic material having framework type AEI;
   wherein Y is one or more of Si, Ge, Sn, Ti, Zr;
   wherein X is one or more of Al, B, Ga, In;
   wherein M is a transition metal of groups 7 to 12 of the periodic table of elements.
2. The process of embodiment 1, wherein M is one or more of Fe, Co, Ni, Cu, and Zn, preferably one or more of Fe and Cu.
3. The process of embodiment 1, wherein M is Cu.
4. The process of any one of embodiments 1 to 3, wherein the zeolitic material provided in (i) comprises M in an amount in the range of from 0.1 to 5 weight-%, preferably in the range of from 0.2 to 4 weight-%, more preferably in the range of from 0.5 to 3 weight-%, calculated as elemental M and based on the total weight of the zeolitic material.

5. The process of any one of embodiments 1 to 4, wherein the zeolitic material provided in (i) has a framework structure which additionally comprises the tetravalent element Y.
6. The process of any one of embodiments 1 to 5, wherein at least 95 weight-%, preferably at least 98 weight-%, more preferably at least 99 weight-%, more preferably at least 99.5 weight-% of the zeolitic material provided in (i) consist of Y, X, O, M, and H.
7. The process of any one of embodiments 1 to 6, wherein X is Al.
8. The process of any one of embodiments 1 to 7, wherein Y is Si.
9. The process of any one of embodiments 1 to 8, wherein in the zeolitic material provided in (i), Y is Si, X is Al, and wherein the molar ratio Si:Al of Si, calculated as elemental Si, relative to Al, calculated as elemental Al, is in the range of from 3:1 to 50:1, preferably in the range of from 5:1 to 30:1, more preferably in the range of from 8:1 to 25:1.
10. The process of any one of embodiments 1 to 9, wherein the zeolitic material provided in (i) has framework type CHA, FAU, LTA, MOR, MFI, or BEA, preferably CHA or FAU.
11. A process for preparing a zeolitic material comprising a metal M, having framework type AEI, and having a framework structure which comprises a tetravalent element Y, a trivalent element X, and oxygen, preferably the process of any one of embodiments 1 to 10, said process comprising
    (i) providing a zeolitic material comprising the metal M, having a framework type other than AEI, and having a framework structure comprising the tetravalent element Y, the trivalent element X, and oxygen;
    (ii) preparing a synthesis mixture comprising the zeolitic material provided in (i), water, a source of the tetravalent element Y, and an AEI framework structure directing agent;
    (iii) subjecting the synthesis mixture prepared in (ii) to hydrothermal synthesis conditions comprising a hydrothermal synthesis temperature in the range of from 100 to 200° C., obtaining a mixture comprising the zeolitic material comprising a metal M, having framework type AEI, and having a framework structure which comprises a tetravalent element Y, a trivalent element X, and oxygen; wherein Y is Si, X is Al, M is Cu, and wherein the zeolitic material provided in (i) has framework type CHA or FAU.
12. The process of any one of embodiments 1 to 11, wherein providing the zeolitic material according to (i) comprises
    (i.1) providing a zeolitic material which does not comprise the metal M, which has the framework type other than AEI, and which has the framework structure comprising the trivalent element X and oxygen;
    (i.2) supporting the metal M on the zeolitic material provided in (i.1), preferably comprising
        (i.2.1) preparing a mixture comprising the zeolitic material provided according to (i.1), a source of the metal M, a solvent for the source of the metal M, and optionally an acid, preferably an organic acid, wherein the solvent preferably comprises water, the source of the metal M preferably comprises a salt of the metal M and the acid preferably comprises acetic acid;
        (i.2.2) heating the mixture prepared in (i.2.1) to a temperature in the range of from 30 to 90° C., preferably in the range of from 40 to 80° C.;
        (i.2.3) preferably cooling, more preferably rapid-cooling the mixture obtained from (i.2.2);
        (i.2.4.) separating the zeolitic material comprising the metal M from the mixture obtained from (i.2.2) or (i.2.3), preferably from (i.2.4), the separating preferably comprising washing the zeolitic material comprising the metal M;
        (i.2.5) preferably drying the zeolitic material comprising the metal M obtained from (i.2.4) in a gas atmosphere, preferably at a temperature of the gas atmosphere in the range of from 90 to 200° C., more preferably in the range of from 100 to 150° C., wherein the gas atmosphere preferably comprises oxygen;
        (i.2.6) preferably calcining the zeolitic material comprising the metal M obtained from (i.2.4) or (i.2.5), preferably (i.2.5), in a gas atmosphere, preferably at a temperature of the gas atmosphere in the range of from 350 to 600° C., more preferably in the range of from 400 to 550° C., wherein the gas atmosphere preferably comprises oxygen.
13. The process of any one of embodiments 1 to 12, wherein the zeolitic material provided in (i) is a calcined zeolitic material, preferably a zeolitic material calcined in a gas atmosphere at a temperature of the gas atmosphere in the range of from 350 to 600° C., preferably in the range of from 400 to 550° C., wherein the gas atmosphere preferably comprises oxygen.
14. The process of any one of embodiments 1 to 13, wherein the zeolitic material provided in (i) is in its H form.
15. The process of any one of embodiments 1 to 14, wherein the synthesis mixture prepared in (ii) which is subjected to (iii) does not contain a zeolitic material having framework type AEI.
16. The process of any one of embodiments 1 to 15, wherein the synthesis mixture prepared in (ii) which is subjected to (iii) does not contain a zeolitic seed material having framework type AEI.
17. The process of any one of embodiments 1 to 16, wherein Y is Si and the source of the tetravalent element Y according to (ii) comprises one or more of a wet-process silica, a dry-process silica, and colloidal silica.
18. The process of any one of embodiments 1 to 17, wherein the source of the tetravalent element according to (ii) comprises, preferably is a colloidal silica.
19. The process of any one of embodiments 1 to 18, wherein the AEI framework structure agent comprises one or more quaternary phosphonium cation containing compounds and/or one or more quaternary ammonium cation containing compounds; wherein the one or more phosphonium cation containing compounds comprise one or more $R^1R^2R^3R^4P^+$-containing compounds, wherein $R^1$, $R^2$, $R^3$, and $R^4$ independently from one another stand for optionally substituted and/or optionally branched $(C_1-C_6)$alkyl, preferably $(C_1-C_5)$alkyl, more preferably $(C_1-C_4)$alkyl, more preferably $(C_2-C_3)$ alkyl, and even more preferably for optionally substituted methyl or ethyl, wherein even more preferably $R^1$, $R^2$, $R^3$, and $R^4$ stand for optionally substituted ethyl, preferably unsubstituted ethyl; wherein the one or more quaternary ammonium cation containing compounds comprise one or more N,N-dialkyl-dialkylpiperidinium cation containing compounds, preferably one or more N,N—($C_1$-$C_3$)dialkyl-($C_1$-$C_3$)dialkylpiperidinium cation containing compounds, more preferably one or more N,N—($C_1$-$C_2$)dialkyl-($C_1$-$C_2$)dialkylpiperi-dinium cation containing compounds, wherein more preferably, the one or more quaternary ammonium cation containing compounds are selected from the group consisting of N,N—($C_1$-$C_2$)dialkyl-2,6-($C_1$-$C_2$)dialkylpiperidinium cation and N,N—($C_1$-$C_2$)dialkyl-3,5-($C_1$-$C_2$)di-alkylpiperidinium cation containing compounds, more preferably from the group consisting of N,N-dimethyl-2,6-($C_1$-$C_2$)dialkylpiperidinium cation and N,N-dimethyl-3,5-($C_1$-$C_2$)dialkyl-piperi-dinium cation containing compounds, more preferably from the group consisting of N,N-dimethyl-2,6-dimethylpiperidinium cation and N,N-dimethyl-3,5-dimethyl-piperidinium cation containing compounds;

wherein the one or more quaternary phosphonium cation containing compounds and/or the one or more quaternary ammonium cation containing compounds are salts, preferably selected from the group consisting of halides, preferably chloride and/or bromide, more preferably chloride; hydroxide; sulfate; nitrate; phosphate; acetate; and mixtures of two or more thereof, more preferably from the group consisting of chloride, hydroxide, sulfate, and mixtures of two or more thereof, wherein more preferably the one or more quaternary phosphonium cation containing compounds and/or the one or more quaternary ammonium cation containing compounds are hydroxides and/or chlorides, and even more preferably hydroxides.

20. The process of any one of embodiments 1 to 19, wherein the AEI framework structure directing agent comprises, preferably is N,N-dimethyl-3,5-dimethylpiperidinium hydroxide.

21. The process of any one of embodiments 1 to 20, wherein in the synthesis mixture prepared in (ii) which is subjected to (iii), the weight ratio of the zeolitic material relative to the source of the tetravalent element Y, calculated as $YO_2$, is in the range of from 1.0:1 to 3.0:1, preferably in the range of from 1.5:1 to 2.5, more preferably in the range of from 2.0:1 to 2.2:1.

22. The process of any one of embodiments 1 to 21, wherein in the synthesis mixture prepared in (ii) which is subjected to (iii), the weight ratio of the zeolitic material relative to the water is in the range of from 0.005:1 to 0.030:1, preferably in the range of from 0.010:1 to 0.025:1, more preferably in the range of from 0.015:1 to 0.020:1.

23. The process of any one of embodiments 1 to 22, wherein in the synthesis mixture prepared in (ii) which is subjected to (iii), the weight ratio of the zeolitic material relative to the AEI framework structure directing agent is in the range of from 0.1:1 to 3:1, preferably in the range of from 0.2:1 to 2:1, more preferably in the range of from 0.3:1 to 0.7:1, more preferably in the range of from 0.4:1 to 0.5:1.

24. The process of any one of embodiments 1 to 23, wherein the synthesis mixture prepared in (ii) which is subjected to (iii) additionally comprises a source of a base, preferably a source of hydroxide.

25. The process of any one of embodiments 1 to 24, wherein the synthesis mixture prepared in (ii) which is subjected to (iii) additionally comprises a source of one or more of an alkali metal and an alkaline earth metal, preferably an alkali metal, more preferably sodium.

26. The process of of embodiment 24 or 25, wherein the source of a base is the source of one or more of an alkali metal and an alkaline earth metal, preferably an alkali metal base, more preferably an alkali metal hydroxide, more preferably sodium hydroxide.

27. The process of any one of embodiments 24 to 26, wherein in the synthesis mixture prepared in (ii) which is subjected to (iii), the weight ratio of the zeolitic material relative to the source of a base is in the range of from 0.1:1 to 1.0:1, preferably in the range of from 0.2:1 to 0.8:1, more preferably in the range of from 0.3:1 to 0.6:1.

28. The process of any one of embodiments 1 to 27, wherein the synthesis mixture prepared in (ii) and which is subjected to (iii) does not comprise a source of the metal M other than the zeolitic material comprising the metal M.

29. The process of any one of embodiments 1 to 28, wherein at least 95 weight-%, preferably at least 98 weight-%, more preferably at least 99 weight-% of the synthesis mixture prepared in (ii) and subjected to (iii) consist of the zeolitic material provided in (i), the water, the source of the tetravalent element Y, the AEI framework structure directing agent, and preferably the source of a base and the source of one or more of an alkali metal and an alkaline earth metal.

30. The process of any one of embodiments 1 to 29, wherein the hydrothermal synthesis is carried out under autogenous pressure, preferably in an autoclave.

31. The process of any one of embodiments 1 to 30, wherein the synthesis mixture prepared in (ii) is heated in the autoclave to the hydrothermal synthesis temperature at a heating rate in the range of from 0.5 to 4 K/min, preferably in the range of from 1 to 3 K/min.

32. The process of any one of embodiments 1 to 31, wherein the hydrothermal synthesis temperature is in the range of from 110 to 175° C., preferably in the range of from 120 to 150° C.

33. The process of any one of embodiments 1 to 32, wherein the hydrothermal synthesis conditions comprise stirring the synthesis mixture.

34. The process of any one of embodiments 1 to 33, wherein the hydrothermal synthesis conditions comprise a hydrothermal synthesis time in the range of from 2 to 120 h, preferably in the range of from 20 to 100 h, more preferably in the range of from 40 to 80 h.

35. The process of any one of embodiments 1 to 34, further comprising (iv) cooling the mixture obtained from (iii), preferably to a temperature in the range of from 10 to 50° C., more preferably in the range of from 20 to 35° C.

36. The process of any one of embodiments 1 to 34, further comprising
    (v) separating the zeolitic material comprising the metal M from the mixture obtained from (iii) or (iv).

37. The process of embodiment 36, wherein (v) comprises
    (v.1) subjecting the mixture obtained from (iii) or (iv) to a solid-liquid separation method, preferably comprising a filtration method or a spraying method;
    (v.2) preferably washing the zeolitic material comprising the metal M obtained from (v.1);
    (v.3) drying the zeolitic material comprising the metal M obtained from (v.1) or (v.2), preferably (v.2).

38. The process of embodiment 37, wherein according to (v.2), the zeolitic material comprising the metal M is washed with water, preferably until the washing water has a conductivity of at most 500 microSiemens, preferably at most 200 microSiemens.

39. The process of embodiment 37 or 38, wherein according to (v.3), the zeolitic material comprising the metal M is dried in a gas atmosphere having a temperature in the range of from 80 to 175° C., preferably in the range of from 100 to 150° C.

40. The process of embodiment 39, wherein the gas atmosphere comprises oxygen, preferably is air, lean air, or synthetic air.

41. The process of any one of embodiments 36 to 40, further comprising
   (vi) calcining the zeolitic material comprising the metal M obtained from (v).

42. The process of embodiment 41, wherein according to (vi), the zeolitic material comprising the metal M is calcined in a gas atmosphere having a temperature in the range of from 400 to 600° C., preferably in the range of from 450 to 550° C.

43. The process of embodiment 42, wherein the gas atmosphere comprises oxygen, preferably is air, lean air, or synthetic air.

44. A process for preparing a zeolitic material comprising a metal M, having framework type AEI, and having a framework structure which comprises a tetravalent element Y, a trivalent element X, and oxygen, preferably the process of any one of embodiments 1 to 10, said process comprising
   (i) providing a zeolitic material comprising the metal M, having a framework type other than AEI, and having a framework structure comprising the tetravalent element Y, the trivalent element X, and oxygen;
   (ii) preparing a synthesis mixture comprising the zeolitic material provided in (i), water, a source of the tetravalent element Y, and an AEI framework structure directing agent;
   (iii) subjecting the synthesis mixture prepared in (ii) to hydrothermal synthesis conditions comprising a hydrothermal synthesis temperature in the range of from 100 to 200° C., obtaining a mixture comprising the zeolitic material comprising a metal M, having framework type AEI, and having a framework structure which comprises a tetravalent element Y, a trivalent element X, and oxygen;
   (iv) cooling the mixture obtained from (iii), preferably to a temperature in the range of from 10 to 50° C., more preferably in the range of from 20 to 35° C.;
   (v) separating the zeolitic material comprising the metal M from the mixture obtained from (iv), comprising
      (v.1) subjecting the mixture obtained from (iv) to a solid-liquid separation method, preferably comprising a filtration method or a spraying method;
      (v.2) washing the zeolitic material comprising the metal M obtained from (v.1);
      (v.3) drying the zeolitic material comprising the metal M obtained from (v.2) in a gas atmosphere having a temperature in the range of from 80 to 175° C.;
      (vi) calcining the zeolitic material comprising the metal M obtained from (v) in a gas atmosphere having a temperature in the range of from 400 to 600° C.

45. The process of embodiment 44, wherein Y is Si, X is Al, M is Cu, and wherein the zeolitic material provided in (i) has framework type CHA or FAU.

46. A zeolitic material comprising a metal M, having framework type AEI, and having a framework structure which comprises a tetravalent element Y, a trivalent element X, and oxygen, obtainable or obtained or preparable or prepared by a process according to any one of embodiments 1 to 45.

47. The zeolitic material comprising a metal M of embodiment 46, comprising M in an amount in the range of from 0.1 to 5 weight-%, preferably in the range of from 0.2 to 4 weight-%, more preferably in the range of from 0.5 to 3 weight-%, calculated as elemental M and based on the total weight of the zeolitic material.

48. The zeolitic material of embodiment 47, wherein M is Cu.

49. The zeolitic material of any one of embodiments 46 to 48, having a total amount of acid sites in the range of from 1.0 to 2.0 mmol/g, wherein the total amount of acid sites is defined as the total molar amount of desorbed ammonia per mass of the zeolitic material determined according to the temperature programmed desorption of ammonia (NH3-TPD) as described in Reference Example 1.6 herein; wherein the zeolitic material has an amount of medium acid sites in the range of from 0.1 to 0.8 mmol/g, wherein the amount of medium acid sites is defined as the amount of desorbed ammonia per mass of the zeolitic material determined according to the temperature programmed desorption of ammonia (NH3-TPD) as described in Reference Example 1.6 herein in the temperature range of from 250 to 500° C.

50. Use of a zeolitic material according to any one of embodiments 46 to 49 as a catalytically active material, catalyst, or catalyst component.

51. The use of embodiment 50 for the selective catalytic reduction of nitrogen oxides in an exhaust gas stream, preferably an exhaust gas stream from a diesel engine.

52. The use of embodiment 50 for the conversion of a C1 compound to one or more olefins, preferably for the conversion of methanol to one or more olefins or the conversion of a synthetic gas comprising carbon monoxide and hydrogen to one or more olefins.

53. A method for selectively catalytically reducing nitrogen oxides in an exhaust gas stream, preferably an exhaust gas stream from a diesel engine, said method comprising bringing the zeolitic material according to any one of embodiments 46 to 49 in contact with said exhaust gas stream.

54. A method for selectively catalytically reducing nitrogen oxides in an exhaust gas stream, preferably an exhaust gas stream from a diesel engine, said method comprising preparing a zeolitic material comprising a metal M, having framework type AEI and having a framework structure which comprises a tetravalent element Y, a trivalent element X, and oxygen by a process according to any one of embodiments 1 to 45, and bringing said exhaust gas stream in contact with a catalyst comprising said zeolitic material.

55. A method for catalytically converting a C1 compound to one or more olefins, preferably converting methanol to one or more olefins or converting a synthetic gas comprising carbon monoxide and hydrogen to one or more olefins, said method comprising bringing the zeolitic material according to any one of embodiments 46 to 49 in contact with said C1 compound.

56. A method for catalytically converting a C1 compound to one or more olefins, preferably converting methanol to one or more olefins or converting a synthetic gas comprising carbon monoxide and hydrogen to one or more olefins, said method comprising preparing a zeolitic material comprising a metal M, having framework type AEI and having a framework structure which comprises a tetravalent element Y, a trivalent element X, and oxygen by a process according to any one of embodiments 1 to 45, and bringing said C1 compound in contact with a catalyst comprising said zeolitic material.

57. A catalyst, preferably a catalyst for selectively catalytically reducing nitrogen oxides in an exhaust gas stream, preferably an exhaust gas stream from a diesel engine, or for catalytically converting a C1 compound to one or more olefins, preferably converting methanol to one or more olefins or converting a synthetic gas comprising carbon monoxide and hydrogen to one or more olefins, said catalyst comprising the zeolitic material according to any one of embodiments 46 to 49.

The present invention is further illustrated by the following set of embodiments and combinations of embodiments resulting from the dependencies and back-references as indicated. In particular, it is noted that in each instance where a range of embodiments is mentioned, for example in the context of a term such as "The process of any one of embodiments 1 to 4", every embodiment in this range is meant to be explicitly disclosed for the skilled person, i.e. the wording of this term is to be understood by the skilled person as being synonymous to "The process of any one of embodiments 1, 2, 3, and 4".

1. A process for preparing a composition comprising a zeolitic material comprising a metal M, having framework type AEI, and having a framework structure which comprises a tetravalent element Y, a trivalent element X, and oxygen, said process comprising
   (i) providing a zeolitic material comprising the metal M, having a framework type other than AEI, and having a framework structure comprising the trivalent element X, and oxygen;
   (ii) preparing a synthesis mixture comprising the zeolitic material provided in (i), water, a source of the tetravalent element Y, and an AEI framework structure directing agent;
   (iii) subjecting the synthesis mixture prepared in (ii) to hydrothermal synthesis conditions comprising heating the synthesis mixture to a temperature in the range of from 100 to 200° C. and keeping the synthesis mixture at a temperature in this range under autogenous pressure, obtaining a mixture comprising the zeolitic material having framework type AEI;
   wherein Y is one or more of Si, Ge, Sn, Ti, Zr;
   wherein X is one or more of Al, B, Ga, In;
   wherein M is a transition metal of groups 7 to 12 of the periodic table of elements.
2. The process of embodiment 1, wherein M is one or more of Fe, Co, Ni, Cu, and Zn, preferably one or more of Fe and Cu.
3. The process of embodiment 1, wherein M is Cu.
4. The process of any one of embodiments 1 to 3, wherein the zeolitic material provided in (i) comprises M in an amount in the range of from 0.1 to 5 weight-%, preferably in the range of from 0.2 to 4 weight-%, more preferably in the range of from 0.5 to 3 weight-%, calculated as elemental M and based on the total weight of the zeolitic material.
5. The process of any one of embodiments 1 to 4, wherein the zeolitic material provided in (i) has a framework structure which additionally comprises the tetravalent element Y.
6. The process of any one of embodiments 1 to 5, wherein at least 95 weight-%, preferably at least 98 weight-%, more preferably at least 99 weight-%, more preferably at least 99.5 weight-% of the zeolitic material provided in (i) consist of Y, X, O, M, and H.
7. The process of any one of embodiments 1 to 6, wherein X is Al.
8. The process of any one of embodiments 1 to 7, wherein Y is Si.
9. The process of any one of embodiments 1 to 8, wherein in the zeolitic material provided in (i), Y is Si, X is Al, and wherein the molar ratio Si:Al of Si, calculated as elemental Si, relative to Al, calculated as elemental Al, is in the range of from 3:1 to 50:1, preferably in the range of from 5:1 to 30:1, more preferably in the range of from 8:1 to 25:1.
10. The process of any one of embodiments 1 to 9, wherein the zeolitic material provided in (i) has framework type CHA, FAU, LTA, MOR, MFI, or BEA, preferably CHA or FAU.
11. A process for preparing a composition comprising a zeolitic material comprising a metal M, having framework type AEI, and having a framework structure which comprises a tetravalent element Y, a trivalent element X, and oxygen, preferably the process of any one of embodiments 1 to 10, said process comprising
    (i) providing a zeolitic material comprising the metal M, having a framework type other than AEI, and having a framework structure comprising the tetravalent element Y, the trivalent element X, and oxygen;
    (ii) preparing a synthesis mixture comprising the zeolitic material provided in (i), water, a source of the tetravalent element Y, and an AEI framework structure directing agent;
    (iii) subjecting the synthesis mixture prepared in (ii) to hydrothermal synthesis conditions comprising a hydrothermal synthesis temperature in the range of from 100 to 200° C., obtaining a mixture comprising the zeolitic material comprising a metal M, having framework type AEI, and having a framework structure which comprises a tetravalent element Y, a trivalent element X, and oxygen;
    wherein Y is Si, X is Al, M is Cu, and wherein the zeolitic material provided in (i) has framework type CHA or FAU.
12. The process of any one of embodiments 1 to 11, wherein providing the zeolitic material according to (i) comprises
    (i.1) providing a zeolitic material which does not comprise the metal M, which has the framework type other than AEI, and which has the framework structure comprising the trivalent element X and oxygen;
    (i.2) supporting the metal M on the zeolitic material provided in (i.1), preferably comprising
       (i.2.1) preparing a mixture comprising the zeolitic material provided according to (i.1), a source of the metal M, a solvent for the source of the metal M, and optionally an acid, preferably an organic acid, wherein the solvent preferably comprises water, the source of the metal M preferably comprises a salt of the metal M and the acid preferably comprises acetic acid;

(i.2.2) heating the mixture prepared in (i.2.1) to a temperature in the range of from 30 to 90° C., preferably in the range of from 40 to 80° C.;

(i.2.3) preferably cooling, more preferably rapid-cooling the mixture obtained from (i.2.2);

(i.2.4.) separating the zeolitic material comprising the metal M from the mixture obtained from (i.2.2) or (i.2.3), preferably from (i.2.4), the separating preferably comprising washing the zeolitic material comprising the metal M;

(i.2.5) preferably drying the zeolitic material comprising the metal M obtained from (i.2.4) in a gas atmosphere, preferably at a temperature of the gas atmosphere in the range of from 90 to 200° C., more preferably in the range of from 100 to 150° C., wherein the gas atmosphere preferably comprises oxygen;

(i.2.6) preferably calcining the zeolitic material comprising the metal M obtained from (i.2.4) or (i.2.5), preferably (i.2.5), in a gas atmosphere, preferably at a temperature of the gas atmosphere in the range of from 350 to 600° C., more preferably in the range of from 400 to 550° C., wherein the gas atmosphere preferably comprises oxygen.

13. The process of any one of embodiments 1 to 12, wherein the zeolitic material provided in (i) is a calcined zeolitic material, preferably a zeolitic material calcined in a gas atmosphere at a temperature of the gas atmosphere in the range of from 350 to 600° C., preferably in the range of from 400 to 550° C., wherein the gas atmosphere preferably comprises oxygen.

14. The process of any one of embodiments 1 to 13, wherein the zeolitic material provided in (i) is in its H form.

15. The process of any one of embodiments 1 to 14, wherein the synthesis mixture prepared in (ii) which is subjected to (iii) does not contain a zeolitic material having framework type AEI.

16. The process of any one of embodiments 1 to 15, wherein the synthesis mixture prepared in (ii) which is subjected to (iii) does not contain a zeolitic seed material having framework type AEI.

17. The process of any one of embodiments 1 to 16, wherein Y is Si and the source of the tetravalent element Y according to (ii) comprises one or more of a wet-process silica, a dry-process silica, and colloidal silica.

18. The process of any one of embodiments 1 to 17, wherein the source of the tetravalent element according to (ii) comprises, preferably is a colloidal silica.

19. The process of any one of embodiments 1 to 18, wherein the AEI framework structure agent comprises one or more quaternary phosphonium cation containing compounds and/or one or more quaternary ammonium cation containing compounds; wherein the one or more phosphonium cation containing compounds comprise one or more $R^1R^2R^3R^4P^+$-containing compounds, wherein $R^1$, $R^2$, $R^3$, and $R^4$ independently from one another stand for optionally substituted and/or optionally branched $(C_1-C_6)$alkyl, preferably $(C_1-C_5)$alkyl, more preferably $(C_1-C_4)$alkyl, more preferably $(C_2-C_3)$ alkyl, and even more preferably for optionally substituted methyl or ethyl, wherein even more preferably $R^1$, $R^2$, $R^3$, and $R^4$ stand for optionally substituted ethyl, preferably unsubstituted ethyl; wherein the one or more quaternary ammonium cation containing compounds comprise one or more N,N-dialkyl-dialkylpiperidinium cation containing compounds, preferably one or more N,N—$(C_1-C_3)$dialkyl-$(C_1-C_3)$dialkylpiperidinium cation containing compounds, more preferably one or more N,N—$(C_1-C_2)$dialkyl-$(C_1-C_2)$dialkylpiperi-dinium cation containing compounds, wherein more preferably, the one or more quaternary ammonium cation containing compounds are selected from the group consisting of N,N—$(C_1-C_2)$dialkyl-2,6-$(C_1-C_2)$dialkylpiperidinium cation and N,N—$(C_1-C_2)$dialkyl-3,5-$(C_1-C_2)$di-alkylpiperidinium cation containing compounds, more preferably from the group consisting of N,N-dimethyl-2,6-$(C_1-C_2)$dialkylpiperidinium cation and N,N-dimethyl-3,5-$(C_1-C_2)$dialkyl-piperidinium cation containing compounds, more preferably from the group consisting of N,N-dimethyl-2,6-dimethylpiperidinium cation and N,N-dimethyl-3,5-dimethyl-piperidinium cation containing compounds;

wherein the one or more quaternary phosphonium cation containing compounds and/or the one or more quaternary ammonium cation containing compounds are salts, preferably selected from the group consisting of halides, preferably chloride and/or bromide, more preferably chloride; hydroxide; sulfate; nitrate; phosphate; acetate; and mixtures of two or more thereof, more preferably from the group consisting of chloride, hydroxide, sulfate, and mixtures of two or more thereof, wherein more preferably the one or more quaternary phosphonium cation containing compounds and/or the one or more quaternary ammonium cation containing compounds are hydroxides and/or chlorides, and even more preferably hydroxides.

20. The process of any one of embodiments 1 to 19, wherein the AEI framework structure directing agent comprises, preferably is N,N-dimethyl-3,5-dimethylpiperidinium hydroxide.

21. The process of any one of embodiments 1 to 20, wherein in the synthesis mixture prepared in (ii) which is subjected to (iii), the weight ratio of the zeolitic material relative to the source of the tetravalent element Y, calculated as $YO_2$, is in the range of from 1.0:1 to 3.0:1, preferably in the range of from 1.5:1 to 2.5, more preferably in the range of from 2.0:1 to 2.2:1.

22. The process of any one of embodiments 1 to 21, wherein in the synthesis mixture prepared in (ii) which is subjected to (iii), the weight ratio of the zeolitic material relative to the water is in the range of from 0.005:1 to 0.030:1, preferably in the range of from 0.010:1 to 0.025:1, more preferably in the range of from 0.015:1 to 0.020:1.

23. The process of any one of embodiments 1 to 22, wherein in the synthesis mixture prepared in (ii) which is subjected to (iii), the weight ratio of the zeolitic material relative to the AEI framework structure directing agent is in the range of from 0.1:1 to 3:1, preferably in the range of from 0.2:1 to 2:1, more preferably in the range of from 0.3:1 to 0.7:1, more preferably in the range of from 0.4:1 to 0.5:1.

24. The process of any one of embodiments 1 to 23, wherein the synthesis mixture prepared in (ii) which is subjected to (iii) additionally comprises a source of a base, preferably a source of hydroxide.

25. The process of any one of embodiments 1 to 24, wherein the synthesis mixture prepared in (ii) which is subjected to (iii) additionally comprises a source of one or more of an alkali metal and an alkaline earth metal, preferably an alkali metal, more preferably sodium.

26. The process of of embodiment 24 or 25, wherein the source of a base is the source of one or more of an alkali metal and an alkaline earth metal, preferably an alkali metal base, more preferably an alkali metal hydroxide, more preferably sodium hydroxide.

27. The process of any one of embodiments 24 to 26, wherein in the synthesis mixture prepared in (ii) which is subjected to (iii), the weight ratio of the zeolitic material relative to the source of a base is in the range of from 0.1:1 to 1.0:1, preferably in the range of from 0.2:1 to 0.8:1, more preferably in the range of from 0.3:1 to 0.6:1.

28. The process of any one of embodiments 1 to 27, wherein the synthesis mixture prepared in (ii) and which is subjected to (iii) does not comprise a source of the metal M other than the zeolitic material comprising the metal M.

29. The process of any one of embodiments 1 to 28, wherein at least 95 weight-%, preferably at least 98 weight-%, more preferably at least 99 weight-% of the synthesis mixture prepared in (ii) and subjected to (iii) consist of the zeolitic material provided in (i), the water, the source of the tetravalent element Y, the AEI framework structure directing agent, and preferably the source of a base and the source of one or more of an alkali metal and an alkaline earth metal.

30. The process of any one of embodiments 1 to 29, wherein the hydrothermal synthesis is carried out under autogenous pressure, preferably in an autoclave.

31. The process of any one of embodiments 1 to 30, wherein the synthesis mixture prepared in (ii) is heated in the autoclave to the hydrothermal synthesis temperature at a heating rate in the range of from 0.5 to 4 K/min, preferably in the range of from 1 to 3 K/min.

32. The process of any one of embodiments 1 to 31, wherein the hydrothermal synthesis temperature is in the range of from 110 to 175° C., preferably in the range of from 120 to 150° C.

33. The process of any one of embodiments 1 to 32, wherein the hydrothermal synthesis conditions comprise stirring the synthesis mixture.

34. The process of any one of embodiments 1 to 33, wherein the hydrothermal synthesis conditions comprise a hydrothermal synthesis time in the range of from 2 to 120 h, preferably in the range of from 20 to 100 h, more preferably in the range of from 40 to 80 h.

35. The process of any one of embodiments 1 to 34, further comprising
  (iv) cooling the mixture obtained from (iii), preferably to a temperature in the range of from 10 to 50° C., more preferably in the range of from 20 to 35° C.

36. The process of any one of embodiments 1 to 34, further comprising
  (v) separating a composition comprising the zeolitic material comprising the metal M from the mixture obtained from (iii) or (iv).

37. The process of embodiment 36, wherein (v) comprises
  (v.1) subjecting the mixture obtained from (iii) or (iv) to a solid-liquid separation method, preferably comprising a filtration method or a spraying method, obtaining a composition comprising the zeolitic material comprising the metal M;
  (v.2) preferably washing the composition comprising the zeolitic material comprising the metal M obtained from (v.1);
  (v.3) drying the composition comprising the zeolitic material comprising the metal M obtained from (v.1) or (v.2), preferably (v.2).

38. The process of embodiment 37, wherein according to (v.2), the composition is washed with water, preferably until the washing water has a conductivity of at most 500 microSiemens, preferably at most 200 microSiemens.

39. The process of embodiment 37 or 38, wherein according to (v.3), the composition is dried in a gas atmosphere having a temperature in the range of from 80 to 175° C., preferably in the range of from 100 to 150° C.

40. The process of embodiment 39, wherein the gas atmosphere comprises oxygen, preferably is air, lean air, or synthetic air.

41. The process of any one of embodiments 36 to 40, further comprising (vi) calcining the composition obtained from (v).

42. The process of embodiment 41, wherein according to (vi), the composition is calcined in a gas atmosphere having a temperature in the range of from 400 to 600° C., preferably in the range of from 450 to 550° C.

43. The process of embodiment 42, wherein the gas atmosphere comprises oxygen, preferably is air, lean air, or synthetic air.

44. A process for preparing a composition comprising a zeolitic material comprising a metal M, having framework type AEI, and having a framework structure which comprises a tetravalent element Y, a trivalent element X, and oxygen, preferably the process of any one of embodiments 1 to 10, said process comprising
  (i) providing a zeolitic material comprising the metal M, having a framework type other than AEI, and having a framework structure comprising the tetravalent element Y, the trivalent element X, and oxygen;
  (ii) preparing a synthesis mixture comprising the zeolitic material provided in (i), water, a source of the tetravalent element Y, and an AEI framework structure directing agent;
  (iii) subjecting the synthesis mixture prepared in (ii) to hydrothermal synthesis conditions comprising a hydrothermal synthesis temperature in the range of from 100 to 200° C., obtaining a mixture comprising the zeolitic material comprising a metal M, having framework type AEI, and having a framework structure which comprises a tetravalent element Y, a trivalent element X, and oxygen;
  (iv) cooling the mixture obtained from (iii), preferably to a temperature in the range of from 10 to 50° C., more preferably in the range of from 20 to 35° C.;
  (v) separating a composition comprising the zeolitic material comprising the metal M from the mixture obtained from (iv), comprising
    (v.1) subjecting the mixture obtained from (iv) to a solid-liquid separation method, preferably comprising a filtration method or a spraying method, obtaining a composition comprising the zeolitic material comprising the metal M;
    (v.2) washing the composition obtained from (v.1);
    (v.3) drying the composition obtained from (v.2) in a gas atmosphere having a temperature in the range of from 80 to 175° C.;

(vi) calcining the composition obtained from (v) in a gas atmosphere having a temperature in the range of from 400 to 600° C.
45. The process of embodiment 44, wherein Y is Si, X is Al, M is Cu, and wherein the zeolitic material provided in (i) has framework type CHA or FAU.
46. The process of any one of embodiments 1 to 45, wherein more than 50 weight-%, preferably at least 60 weight-%, more preferably at least 70 weight-% of the composition comprising the zeolitic material comprising a metal M, having framework type AEI, and having a framework structure which comprises a tetravalent element Y, a trivalent element X, and oxygen consist of the zeolitic material comprising a metal M, having framework type AEI and having a framework structure which comprises a tetravalent element Y, a trivalent element X, and oxygen.
47. The process of embodiment 46, wherein at least 80 weight-%, preferably from 80 to 100 weight-% of the composition comprising a zeolitic material comprising a metal M, having framework type AEI and having a framework structure which comprises a tetravalent element Y, a trivalent element X, and oxygen, consist of the zeolitic material comprising a metal M, having framework type AEI and having a framework structure which comprises a tetravalent element Y, a trivalent element X, and oxygen.
48. The process of embodiment 46 or 47, wherein at least 90 weight-%, preferably at least 95 weight-%, more preferably at least 99 weight-% of the composition consist of the zeolitic material comprising a metal M, having framework type AEI and having a framework structure which comprises a tetravalent element Y, a trivalent element X, and oxygen, and the zeolitic material comprising the metal M, having a framework type other than AEI, and having a framework structure comprising the tetravalent element Y, the trivalent element X, and oxygen.
49. A composition comprising a zeolitic material comprising a metal M, having framework type AEI, and having a framework structure which comprises a tetravalent element Y, a trivalent element X, and oxygen, obtainable or obtained or preparable or prepared by a process according to any one of embodiments 1 to 48.
50. The composition of embodiment 49, comprising M in an amount in the range of from 0.1 to 5 weight-%, preferably in the range of from 0.2 to 4 weight-%, more preferably in the range of from 0.5 to 3 weight-%, calculated as elemental M and based on the total weight of the zeolitic material.
51. The composition of embodiment 50, wherein M is Cu.
52. The composition of any one of embodiments 49 to 51, having a total amount of acid sites in the range of from 1.0 to 2.0 mmol/g, wherein the total amount of acid sites is defined as the total molar amount of desorbed ammonia per mass of the zeolitic material determined according to the temperature programmed desorption of ammonia (NH3-TPD) as described in Reference Example 1.6 herein; wherein the zeolitic material has an amount of medium acid sites in the range of from 0.1 to 0.8 mmol/g, wherein the amount of medium acid sites is defined as the amount of desorbed ammonia per mass of the zeolitic material determined according to the temperature programmed desorption of ammonia (NH3-TPD) as described in Reference Example 1.6 herein in the temperature range of from 250 to 500° C.
53. Use of a composition according to any one of embodiments 49 to 52 as a catalytically active material, catalyst, or catalyst component.
54. The use of embodiment 53 for the selective catalytic reduction of nitrogen oxides in an exhaust gas stream, preferably an exhaust gas stream from a diesel engine.
55. The use of embodiment 53 for the conversion of a C1 compound to one or more olefins, preferably for the conversion of methanol to one or more olefins or the conversion of a synthetic gas comprising carbon monoxide and hydrogen to one or more olefins.
56. A method for selectively catalytically reducing nitrogen oxides in an exhaust gas stream, preferably an exhaust gas stream from a diesel engine, said method comprising bringing the composition according to any one of embodiments 49 to 52 in contact with said exhaust gas stream.
57. A method for selectively catalytically reducing nitrogen oxides in an exhaust gas stream, preferably an exhaust gas stream from a diesel engine, said method comprising preparing a composition by a process according to any one of embodiments 1 to 48, and bringing said exhaust gas stream in contact with a catalyst comprising said composition.
58. A method for catalytically converting a C1 compound to one or more olefins, preferably converting methanol to one or more olefins or converting a synthetic gas comprising carbon monoxide and hydrogen to one or more olefins, said method comprising bringing the composition according to any one of embodiments 49 to 52 in contact with said C1 compound.
59. A method for catalytically converting a C1 compound to one or more olefins, preferably converting methanol to one or more olefins or converting a synthetic gas comprising carbon monoxide and hydrogen to one or more olefins, said method comprising preparing a composition by a process according to any one of embodiments 1 to 48, and bringing said C1 compound in contact with a catalyst comprising said composition.
60. A catalyst, preferably a catalyst for selectively catalytically reducing nitrogen oxides in an exhaust gas stream, preferably an exhaust gas stream from a diesel engine, or for catalytically converting a C1 compound to one or more olefins, preferably converting methanol to one or more olefins or converting a synthetic gas comprising carbon monoxide and hydrogen to one or more olefins, said catalyst comprising the composition according to any one of embodiments 49 to 52.

The present invention is further illustrated by the following examples, comparative examples, and reference examples.

EXAMPLES

Reference Example 1.1

Determination of the Crystallinity

The crystallinity of the zeolitic materials according to the present invention were determined by XRD analysis. The data were collected using a standard Bragg-Brentano diffractometer with a Cu-X-ray source and an energy dispersive point detector. The angular range of 2° to 70° (2 theta) was scanned with a step size of 0.02°, while the variable divergence slit was set to a constant opening angle of 0.3°. The data were then analyzed using TOPAS V5 software, wherein the sharp diffraction peaks were modeled using PONKCS phases for AEI and FAU and the crystal structure for CHA. The model was prepared as described in Madsen, I. C. et al. This was refined to fit the data. An independent peak was inserted at the angular position 28°. This was used to describe the amorphous content. The crystalline content describes the intensity of the crystalline signal to the total scattered intensity. Included in the model were also a linear background, Lorentz and polarization corrections, lattice parameters, space group and crystallite size.

Reference Example 1.2

Determination of the BET Specific Surface Area

The BET specific surface area was determined according to ISO 9277, second edition 2010, via nitrogen physisorption at 77 K.

Reference Example 1.3

Determination of the C Value

The C value (BET parameter) was determined as described in ISO 9277, second edition 2010, section 7.2.

Reference Example 1.4

Determination of the XRD Patterns

The XRD diffraction patterns were determined as described in Reference Example 1.1.

Reference Example 1.5

Scanning Electron Microscopy

The SEM (Scanning Electron Microscopy) pictures (secondary electron (SE) picture at 15 kV (kiloVolt)) were made using a Hitachi TM3000.

Reference Example 1.6

Temperature Programmed Desorption of Ammonia ($NH_3$-TPD)

The temperature-programmed desorption of ammonia (NH3-TPD) was conducted in an automated chemisorption analysis unit (Micromeritics AutoChem II 2920) having a thermal conductivity detector. Continuous analysis of the desorbed species was accomplished using an online mass spectrometer (OmniStar QMG200 from Pfeiffer Vacuum). The sample (0.1 g) was introduced into a quartz tube and analysed using the program described below. The temperature was measured by means of an Ni/Cr/Ni thermocouple immediately above the sample in the quartz tube. For the analyses, He of purity 5.0 was used. Before any measurement, a blank sample was analysed for calibration.
 1. Preparation: Commencement of recording; one measurement per second. Wait for 10 minutes at 25° C. and a He flow rate of 30 $cm^3$/min (room temperature (about 25° C.) and 1 atm); heat up to 600° C. at a heating rate of 20 K/min; hold for 10 minutes. Cool down under a He flow (30 $cm^3$/min) to 100° C. at a cooling rate of 20 K/min (furnace ramp temperature); Cool down under a He flow (30 $cm^3$/min) to 100° C. at a cooling rate of 3 K/min (sample ramp temperature).
 2. Saturation with $NH_3$: Commencement of recording; one measurement per second. Change the gas flow to a mixture of 10% $NH_3$ in He (75 $cm^3$/min; 100° C. and 1 atm) at 100° C.; hold for 30 minutes.
 3. Removal of the excess: Commencement of recording; one measurement per second. Change the gas flow to a He flow of 75 $cm^3$/min (100° C. and 1 atm) at 100° C.; hold for 60 min.
 4. $NH_3$-TPD: Commencement of recording; one measurement per second. Heat up under a He flow (flow rate: 30 $cm^3$/min) to 600° C. at a heating rate of 10 K/min; hold for 30 minutes.
 5. End of measurement.

Desorbed ammonia was measured by means of the online mass spectrometer, which demonstrates that the signal from the thermal conductivity detector was caused by desorbed ammonia. This involved utilizing the m/z=16 signal from ammonia in order to monitor the desorption of the ammonia. The amount of ammonia adsorbed (mmol/g of sample) was ascertained by means of the Micromeritics software through integration of the TPD signal with a horizontal baseline.

Reference Example 2.1

Preparation of CuCHA a) A CHA zeolitic material (sodium form) was prepared according to the template-free synthesis method as described in WO 2013/068976 A, in Example 2, page 43, line 29 to page 44, line 8.
b) 4,000 g de-ionized water were filled in a vessel. 590 g ammonium nitrate were dissolved therein under stirring, and subsequently, 590 g of the zeolitic material (sodium form) obtained according to a) were admixed under stirring, followed by rinsing with 190 g de-ionized water. The obtained suspension was heated to 80° C. and kept at this temperature for 2 h. The obtained ammonium form of the zeolitic material was separated from the suspension by filtration and washed until the washing water was free of nitrate. The thus separated zeolitic material was dried overnight in a convection oven at 120° C.
b) 130 g of the zeolitic material of a) were heated from room temperature to 450° C. at a heating rate of 2 K/min under air and calcination at this temperature for 10 h under air, obtaining the H form of the zeolitic material.
c) Preparation of CuCHA
Materials used:
Zeolite CHA obtained from b) 120 g
De-ionized water: 780 g
Acetic acid (aq. solution, 70 weight-%): 1.332 g
Cu(II) acetate monohydrate 17.16 g 700 g de-ionized water were transferred in a vessel, and the zeolite CHA was added under stirring, followed by the addition of 30 g de-ionized water. The resulting suspension was heated to 60° C. and at this temperature, the acetic acid was added, followed by the addition of the Cu(II) acetate monohydrate. Then, 50 g water were added. The resulting mixture was kept at this temperature of 60° C. for 2 h. The suspension obtained was rapid-cooled by the addition of 586 g cold distilled water. The obtained suspension was subjected to filtration using a nutsch-type filter and the filter cake was washed with de-ionized water until the washing water had a conductivity of less than 20 microSiemens. The thus washed zeolitic material was dried overnight at 120° C. under air in a convection oven, followed by heating at a heating rate of 2 K/min to a temperature of 500° C. and calcination at this temperature for 5 h. 124 g zeolitic material CuCHA were obtained. Elemental analysis of the zeolitic material, in weight-%: Si=29.3; Al=6.5; Na=0.07; Cu=3.1.

Reference Example 2.2

Preparation of CuY a) 50 g of a zeolite Y in its ammonium form were provided (CBV-500 from Zeolyst). Characterization of the zeolite Y:silica:alumina ratio (SAR)=5.2; unit cell size=24.53 Angstrom; BET specific surface area=750 m$^3$/g; Na$_2$O content=0.2 weight-%.
b) The zeolitic material of a) was converted into its H form by heating from room temperature to 500° C. at a heating rate of 2 K/min under air and calcination at this temperature for 5 h under air.
c) Preparation of CuY
Materials used:
Zeolite Y obtained from b) 51 g
De-ionized water: 332 g
Acetic acid (aq. solution, 70 weight-%): 0.6 g
Cu(II) acetate monohydrate 7.3 g 250 g de-ionized water were transferred in a vessel, and the zeolite Y was added under stirring, followed by the addition of 30 g de-ionized water. The resulting suspension was heated to 60° C. and at this temperature, the acetic acid was added, followed by the addition of the Cu(II) acetate monohydrate. Then, the remaining amount of water was added. The resulting mixture was kept at this temperature of 60° C. for 2 h. The suspension obtained was rapid-cooled by the addition of 200 g cold distilled water. The obtained suspension was subjected to filtration using a nutsch-type filter and the filter cake was washed with de-ionized water until the washing water had a conductivity of less than 20 microSiemens. The thus washed zeolitic material was dried overnight at 120° C. under air in a convection oven, followed by heating at a heating rate of 2 K/min to a temperature of 500° C. and calcination at this temperature for 5 h. 48.6 g zeolitic material CuY were obtained.

Elemental analysis of the zeolitic material, in weight-%: Si=27.2; Al=9.2; Na=0.11; Cu=1.7.

Example 1

Preparation of CuAEI, Starting from CuCHA

Materials used:
NaOH (aqueous solution; 50 weight-%): 70.73 g
De-ionized water: 770.71 g
1,1,3,5-tetramethylpiperidinium OH (Sachem; aq. mixture, 19.77 weight-%): 196.18 g
Ludox® AS40 (Grace; colloidal silica; aqueous solution, 40 weight-%): 19.80 g
CuCHA zeolitic material, according to Reference Example 2.1 above: 16.40 g A beaker was filled with 670.71 g de-ionized water, and under stirring, the NaOH solution was added. Then, the template compound (1,1,3,5-tetramethylpiperidinium hydroxide) was added under stirring, followed by adding the CuCHA zeolitic material under stirring. This mixture was further stirred for 1 h. Then, the colloidal silica solution was added under stirring and the resulting mixture was stirred for another 0.5 h. The obtained suspension was transferred to a 2.5 L autoclave, and the involved lines were rinsed with the remaining 100 g of the de-ionized water. Then, the autoclave was sealed.

Within 1 h, the mixture in the autoclave was heated to a temperature of 140° and kept at this crystallization temperature for 72 h under stirring at 250 rpm. After pressure release and cooling to room temperature, the obtained suspension was subjected to filtration using a nutsch-type filter and the filter cake was washed with de-ionized water until the washing water had a conductivity of less than 200 microSiemens. The thus washed zeolitic material was dried overnight at 120° C. under air in a convection oven, followed by heating at a heating rate of 2 K/min to a temperature of 500° C. and calcination at this temperature for 5 h. 24.0 g zeolitic material were obtained, the space-time yield was 6.15 kg/m$^3$/d.

Elemental analysis of the zeolitic material, in weight-%: Si=32; Al=4.6; Na=3.4; Cu=2.0.

The crystallinity was 65%, determined as described in Reference Example 1.1. The BET specific surface area was 501 m$^2$/g, determined as described in Reference Example 1.2. The C value was −62, determined as described in Reference Example 1.3. The XRD pattern, determined as described in Reference Example 1.4, is shown in FIG. 1. The SEM picture, determined as described in Reference Example 1.5, is shown in FIG. 2.

82% of the crystalline material was CuAEI, 18% of the material was CuCHA.

Example 2

Preparation of CuAEI, Starting from CuY

Materials used:
NaOH (aqueous solution; 50 weight-%): 70.73 g
De-ionized water: 770.71 g
1,1,3,5-tetramethylpiperidinium OH (Sachem; aq. mixture, 19.77 weight-%): 196.18 g
Ludox® AS40 (Grace; colloidal silica; aqueous solution, 40 weight-%): 19.80 g
CuY zeolitic material, according to Reference Example 2.2 above: 16.40 g A beaker was filled with 670.71 g de-ionized water, and under stirring, the NaOH solution was added. Then, the template compound (1,1,3,5-tetramethylpiperidinium hydroxide) was added under stirring, followed by adding the CuCHA zeolitic material under stirring. This mixture was further stirred for 1 h. Then, the colloidal silica solution was added under stirring and the resulting mixture was stirred for another 0.5 h. The obtained suspension was transferred to a 2.5 L autoclave, and the involved lines were rinsed with the remaining 100 g of the de-ionized water. Then, the autoclave was sealed. Within 1 h, the mixture in the autoclave was heated to a temperature of 140° and kept at this crystallization temperature for 72 h under stirring at 250 rpm. After pressure release and cooling to room temperature, the obtained suspension was subjected to filtration using a nutsch-type filter and the filter cake was washed with de-ionized water until the washing water had a conductivity of less than 200 microSiemens. The thus washed zeolitic material was dried overnight at 120° C. under air in a convection oven, followed by heating ing at a heating rate of 2 K/min to a temperature of 500° C. and calcination at this temperature for 5 h. 28.1 g zeolitic material were obtained, the space-time yield was 7.21 kg/m$^3$/d.

Elemental analysis of the zeolitic material, in weight-%: Si=35; Al=4.2; Na=1.4; Cu=0.71.

The crystallinity was 94%, determined as described in Reference Example 1.1. The BET specific surface area was 583 m²/g, determined as described in Reference Example 1.2. The C value was −52, determined as described in Reference Example 1.3. The XRD pattern, determined as described in Reference Example 1.4, is shown in FIG. 3.

85% of the crystalline material consisted of CuAEI, 15% of the material consisted of CuY.

Example 3

Use of the Zeolitic Material Comprising a Metal M (Cu) Having Framework Type AEI for Selectively Catalytically Reducing Nitrogen Oxides From the zeolitic materials obtained from Example 1 (powder) and Example 2 (powder), moldings were prepared by mixing the respective material with a milled alumina slurry (Puralox® TM 100/150) (weight ratio of zeolitic material:alumina=70:30). Under stirring, the moldings were dried and calcined for 1 h at 550° C. The moldings were then crushed and sieved to as particle size of 250-500 micrometer. For the subsequent tests, the respectively aged materials were used. For ageing, the crushed and sieved particles were subjected for 50 h to air comprising 10 weight-% water at 650° C., optionally followed by subjecting for 16 h to air comprising 10 weight-% water at 800° C. These crushed and aged materials were subjected to a selective catalytic reduction test. For this purpose, the respective aged samples (170 mg each) were diluted with 1 mL corundum having the same particle size as the samples. A given sample was exposed to a feed stream (500 ppm NO, 500 ppm $NH_3$, 5% $H_2O$, 10% $O_2$, balance $N_2$) at a gas hourly space velocity of 80,000 $h^{-1}$, at temperatures of the feed stream of 200 and 575° C. The results obtained are shown in FIGS. 4 and 5. In FIGS. 4 and 5, the test results of a reference material are also shown.

The reference material is a zeolitic material having framework type CHA which was prepared as described in Example 1 of WO 2013/182974 A1, on page 47, lines 1 to 18. This material was formed, crushed, aged and tested as the materials of the present invention.

CITED LITERATURE

Figure 1:
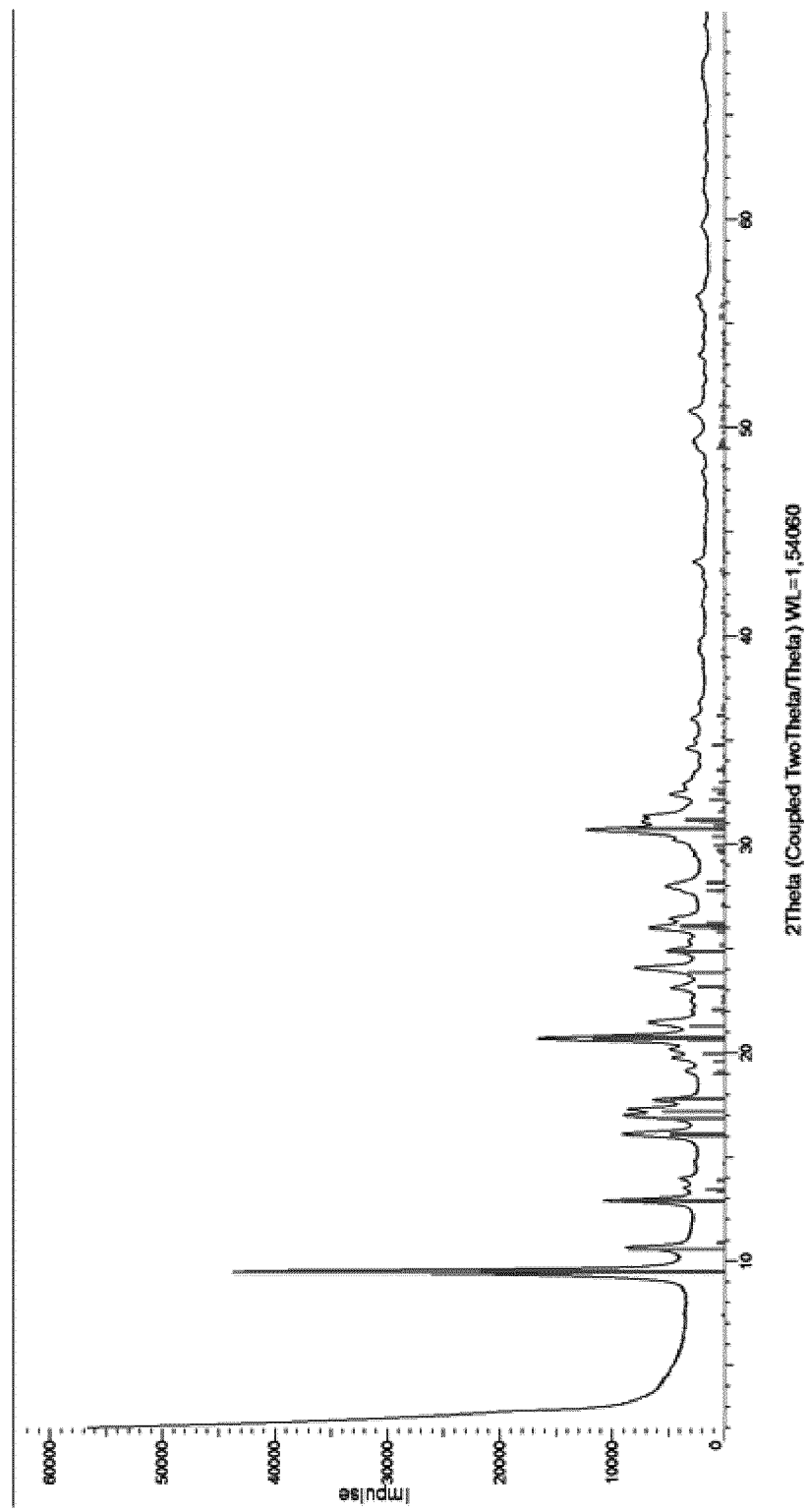
FIG. 1: shows the XRD pattern of the Cu containing zeolitic material according to Example 1.
Figure 2:
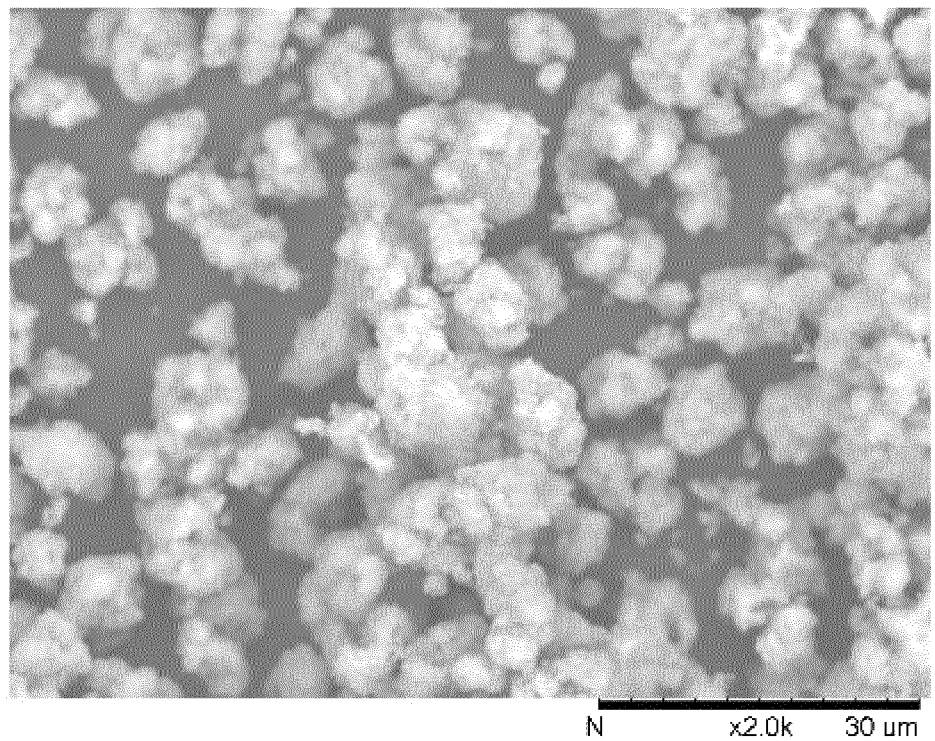
FIG. 2: shows the SEM picture of the Cu containing zeolitic material according to Example 1.
Figure 3:
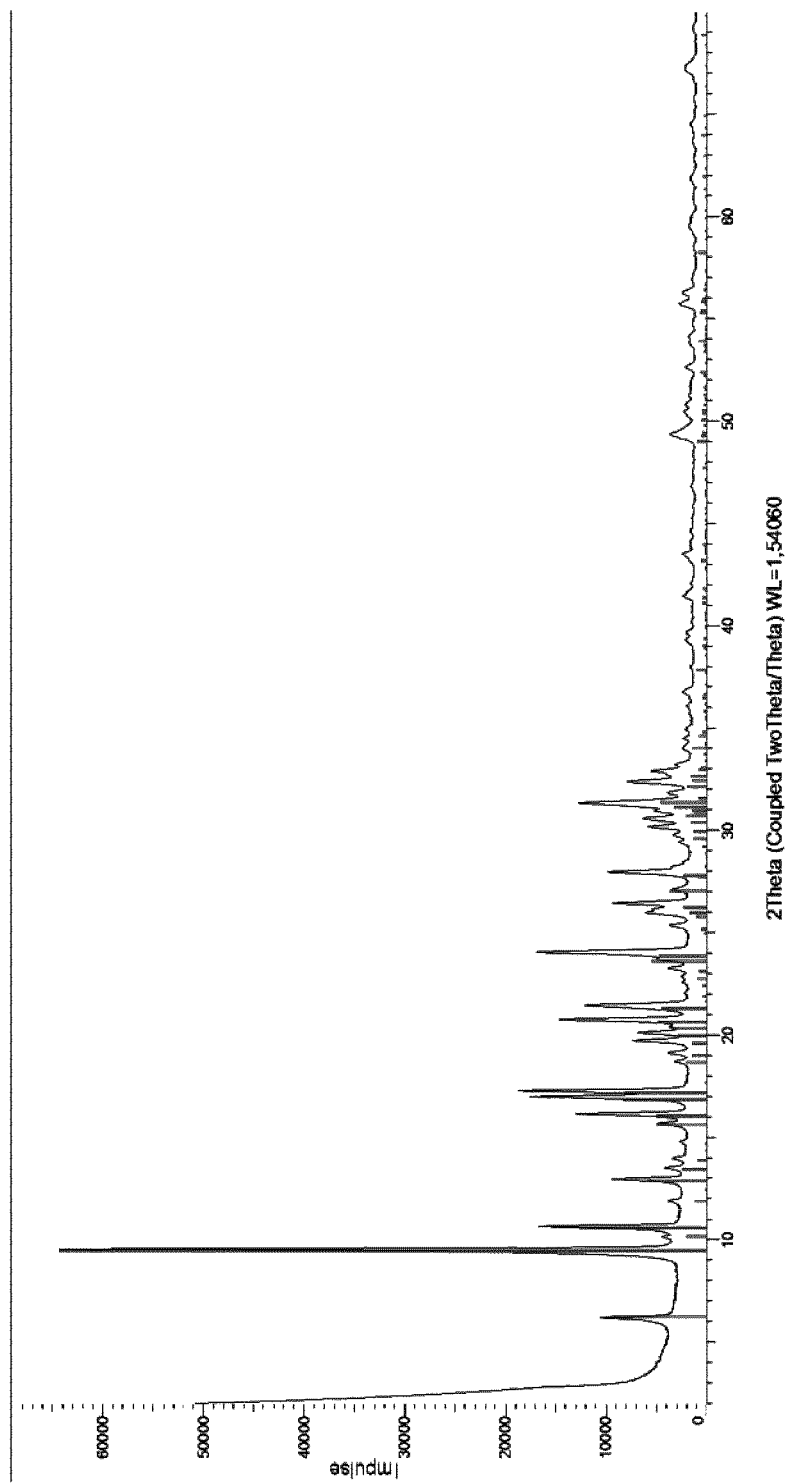
FIG. 3: shows the XRD pattern of the Cu containing zeolitic material according to Example 2.
Figure 4:
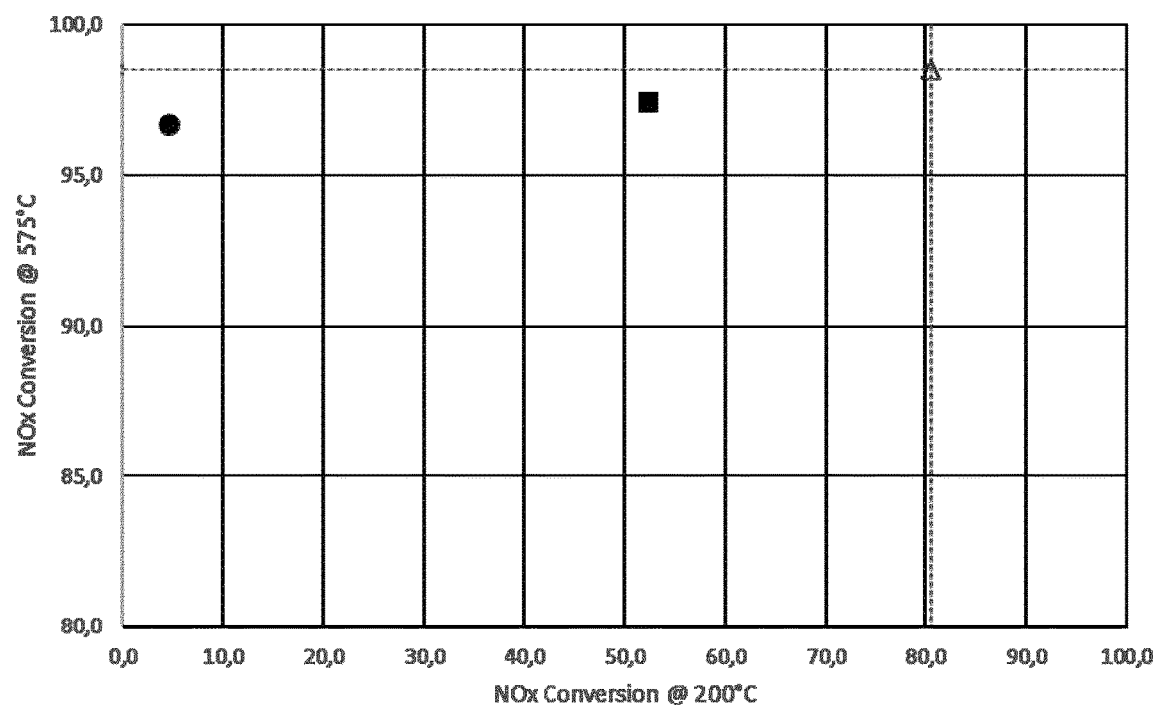
FIG. 4: shows a result of the testing according to Example 3, in particular the result of the respective materials aged at 650° C. (simulating heavy duty diesel application). The x axis shows the conversion of NOx for the respective material at a conversion temperature of 200° N, the y axis shows the conversion of NOx for the respective material at a conversion temperature of 200° C. The empty triangle symbol stands for the reference material, the template-free CHA zeolite, the black square stands for the zeolitic material according to Example 1, the black circle stands for the zeolitic material according to Example 2.
Figure 5:
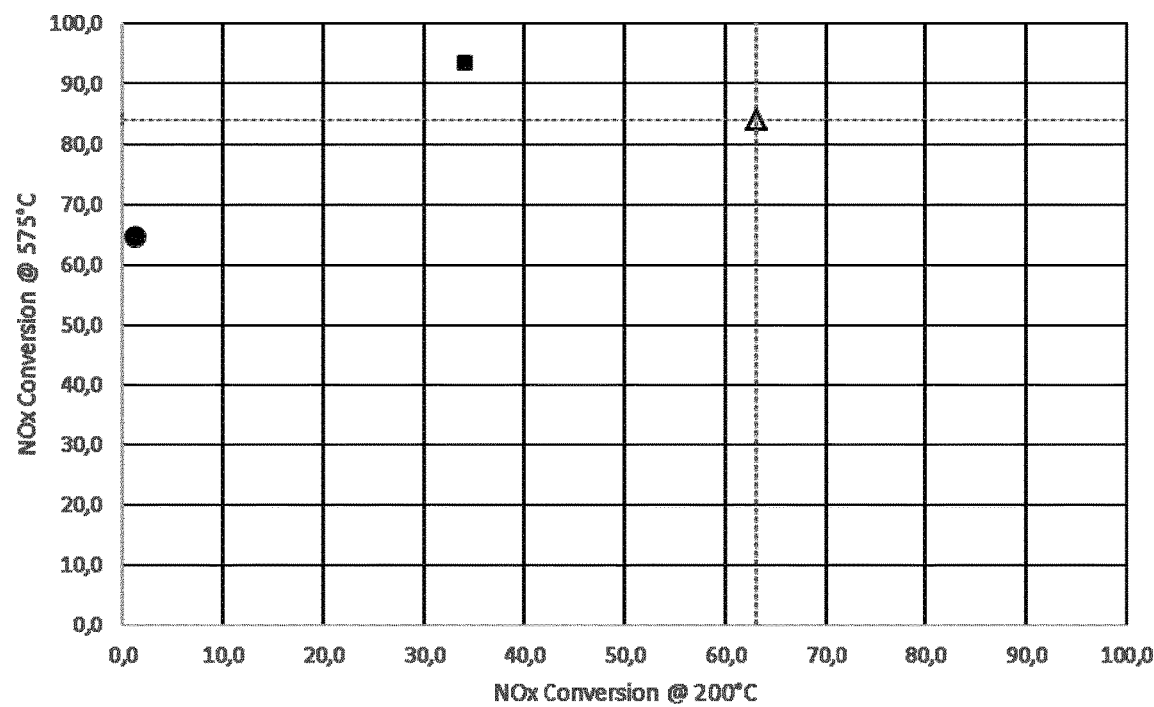
FIG. 5: shows a result of the testing according to Example 3, in particular the result of the respective materials aged at 800° C. (simulating light duty diesel application). The x axis shows the conversion of NOx for the respective material at a conversion temperature of 200° N, the y axis shows the conversion of NOx for the respective material at a conversion temperature of 200° C. The empty triangle symbol stands for the reference material, the template-free CHA zeolite, the black square stands for the zeolitic material according to Example 1, the black circle stands for the zeolitic material according to Example 2.

WO 2013/068976 A
Madsen, I. C., Scarlett, N. V. Y. (2008) "Quantitative phase analysis" in: Dinnebier, R. E., Billinge S. J. L. (eds) "Powder diffraction: theory and practice", The Royal Society of Chemistry, Cambridge, pp. 298-331
WO 2013/182974 A

The invention claimed is:

1. A process for preparing a zeolitic material comprising a metal M, having framework type AEI, and having a framework structure which comprises a tetravalent element Y, a trivalent element X, and oxygen, said process comprising:
   (i) providing a zeolitic material comprising the metal M, having a framework type other than AEI, and having a framework structure comprising the trivalent element X, and oxygen;
   (ii) preparing a synthesis mixture comprising the zeolitic material provided in (i), water, a source of the tetravalent element Y, and an AEI framework structure directing agent;
   (iii) subjecting the synthesis mixture prepared in (ii) to hydrothermal synthesis conditions comprising heating the synthesis mixture to a hydrothermal synthesis temperature in a range from 100° C. to 200° C., to obtain a heated synthesis mixture, and keeping the heated synthesis mixture at a temperature in said range under autogenous pressure, to obtain a mixture comprising zeolitic material having framework type AEI;
   wherein Y is Si;
   X is one or more of Al, B, Ga, and In; and
   M is a transition metal of groups 7 to 12 of the periodic table of elements;
   wherein the source of the tetravalent element Y according to (ii) comprises one or more chosen from a wet-process silica, a dry-process silica, and a colloidal silica.

2. The process of claim 1, wherein M chosen from one or more of Fe, Co, Ni, Cu, and Zn.

3. The process of claim 1, wherein the zeolitic material provided in (i) comprises M in an amount in a range from 0.1 weight-% to 5 weight-%, calculated as elemental M and based on a total weight of the zeolitic material provided in (i).

4. The process of claim 1, wherein the zeolitic material provided in (i) has a framework structure which additionally comprises the tetravalent element Y.

5. The process of claim 1, wherein X is Al and Y is Si.

6. The process of claim 1, wherein the zeolitic material provided in (i) has the framework type of CHA, FAU, LTA, MOR, MFI, or BEA.

7. The process of claim 1, wherein (i) comprises:
   (i.1) providing a zeolitic material which does not comprise the metal M, which has the framework type other than AEI, and which has the framework structure comprising the trivalent element X and oxygen; and
   (i.2) supporting the metal M on the zeolitic material provided in (i.1).

8. The process of claim 1, wherein
   the AEI framework structure directing agent comprises one or more quaternary phosphonium cation containing compounds, one or more quaternary ammonium cation containing compounds, or one or more quaternary phosphonium cation containing compounds and one or more quaternary ammonium cation containing compounds;

wherein the one or more quaternary phosphonium cation containing compounds comprise one or more R1R2R3R4P-containing compounds, wherein R1, R2, R3, and R4 independently from one another represent optionally substituted branched (C1-C6)alkyl, optionally branched (C1-C6)alkyl, or optionally substituted branched (C1-C6)alkyl and optionally branched (C1-C6)alkyl;

the one or more quaternary ammonium cation containing compounds comprise one or more N,N-dialkyl-dialkylpiperidinium cation containing compounds; and the one or more quaternary phosphonium cation containing compounds and/or the one or more quaternary ammonium cation containing compounds are salts.

9. The process of claim 1, wherein in the synthesis mixture prepared in (ii) which is subjected to (iii), a weight ratio of the zeolitic material provided in (i) relative to the source of the tetravalent element Y, calculated as YO2, is in a the range from 1.0:1 to 3.0:1; a weight ratio of the zeolitic material provided in (i) relative to the water is in a range from 0.005:1 to 0.030:1; and a weight ratio of the zeolitic material provided in (i) relative to the AEI framework structure directing agent is in a range from 0.1:1 to 3:1.

10. The process of claim 1, wherein the synthesis mixture prepared in (ii) which is subjected to (iii) additionally comprises a source of a base.

11. The process of claim 1, wherein the hydrothermal synthesis temperature is in a range from 110° C. to 175° C.

12. The process of claim 1, further comprising:
(iv) cooling the mixture obtained from (iii), to obtain a cooled mixture;
(v) separating the zeolitic material comprising the metal M from the mixture obtained from (iii) or from the cooled mixture obtained from (iv), to obtain a separated zeolitic material comprising the metal M; and
(vi) calcining the separated zeolitic material comprising the metal M obtained from (v).

13. A zeolitic material having framework type AEI prepared by the process of claim 1, comprising M in an amount in a range from 0.1 weight-% to 5 weight-%, calculated as elemental M and based on a total weight of the zeolitic material having framework type AEI.

14. The zeolitic material having framework type AEI of claim 13, wherein a total amount of acid sites ranges from 1.0 mmol/g to 2.0 mmol/g, wherein the total amount of acid sites is a total molar amount of desorbed ammonia per mass of the zeolitic material having framework type AEI determined according to a temperature programmed desorption of ammonia; wherein the zeolitic material having framework type AEI has an amount of medium acid sites in a range from 0.1 mmol/g to 0.8 mmol/g, wherein the amount of medium acid sites is an amount of desorbed ammonia per mass of the zeolitic material having framework type AEI determined according to the temperature programmed desorption of ammonia in a temperature range from 250° C. to 500° C.

15. An article, wherein the article is a catalytically active material, catalyst, or catalyst component comprising the zeolitic material of claim 13.

16. A zeolitic material comprising:
at least 60% crystalline material,
wherein the crystalline material comprises from 70% to 90% framework type AEI and from 10% to 30% a framework type other than AEI; and
wherein the zeolitic material has a total amount of acid sites in a range from 1.0 mmol/g to 2.0 mmol/g, and the total amount of acid sites is a total molar amount of desorbed ammonia per mass of the zeolitic material having framework type AEI determined according to a temperature programmed desorption of ammonia.

* * * * *